(12) United States Patent
Kean et al.

(10) Patent No.: US 10,689,831 B2
(45) Date of Patent: Jun. 23, 2020

(54) CONVERTING MOBILE MACHINES INTO HIGH PRECISION ROBOTS

(71) Applicant: Deere & Company, Moline, IL (US)

(72) Inventors: Michael G. Kean, Maquoketa, IA (US); Scott S. Hendron, Dubuque, IA (US)

(73) Assignee: Deere & Company, Moline, IL (US)

( * ) Notice: Subject to any disclaimer, the term of this patent is extended or adjusted under 35 U.S.C. 154(b) by 175 days.

(21) Appl. No.: 15/937,127

(22) Filed: Mar. 27, 2018

(65) Prior Publication Data
US 2019/0301144 A1 Oct. 3, 2019

(51) Int. Cl.
E02F 9/26 (2006.01)
E02F 3/43 (2006.01)
B25J 5/00 (2006.01)
B25J 9/16 (2006.01)
B25J 19/02 (2006.01)
B25J 9/10 (2006.01)

(52) U.S. Cl.
CPC ............... *E02F 9/265* (2013.01); *B25J 5/005* (2013.01); *B25J 9/106* (2013.01); *B25J 9/1628* (2013.01); *B25J 19/021* (2013.01); *E02F 3/43* (2013.01)

(58) Field of Classification Search
CPC .... E02F 9/265; E02F 3/43; B25J 5/005; B25J 9/106; B25J 9/1628; B25J 19/021
See application file for complete search history.

(56) References Cited

U.S. PATENT DOCUMENTS

| | | | |
|---|---|---|---|
| 5,799,419 A | 9/1998 | Seo et al. | |
| 6,059,048 A | 5/2000 | Subrt | |
| 8,644,964 B2 | 2/2014 | Hendron et al. | |
| 9,415,507 B2 | 8/2016 | Foster et al. | |
| 9,464,405 B2 | 10/2016 | Friend | |
| 2004/0158355 A1 | 8/2004 | Holmqvist et al. | |
| 2004/0267404 A1* | 12/2004 | Danko | B25J 9/1607 700/245 |
| 2005/0138850 A1* | 6/2005 | Brickner | E02F 3/437 37/348 |
| 2005/0177292 A1 | 8/2005 | Okamura et al. | |

(Continued)

FOREIGN PATENT DOCUMENTS

| | | |
|---|---|---|
| CA | 2694450 A | 8/2011 |
| CN | 102819972 B | 12/2012 |

(Continued)

OTHER PUBLICATIONS

Turret Test Systems, www.moog.com/products/turret-test systems. html, accessed Apr. 25, 2018, 2 pages.

*Primary Examiner* — Sze-Hon Kong
(74) *Attorney, Agent, or Firm* — Joseph R. Kelly; Kelly, Holt & Christenson PLLC

(57) ABSTRACT

A computing system includes actuator control logic configured to generate and send control signals to an actuator of a mobile machine configured to drive direction and speed movement of a linkage on the mobile machine. The computing system also includes a control map generator system configured to receive sensor signals indicative of the direction and speed movement of the linkage on the mobile machine, and, based on the received sensor signals, generate a control mapping that maps the control signals to the direction and speed movement of the linkage of the mobile machine.

17 Claims, 13 Drawing Sheets

(56) References Cited

U.S. PATENT DOCUMENTS

| | | | |
|---|---|---|---|
| 2007/0168100 A1* | 7/2007 | Danko | B25J 9/1628 |
| | | | 701/50 |
| 2008/0162005 A1 | 7/2008 | Tang et al. | |
| 2008/0243456 A1* | 10/2008 | Hudetz | G06F 30/17 |
| | | | 703/7 |
| 2009/0069987 A1* | 3/2009 | Omelchenko | E02F 3/842 |
| | | | 701/50 |
| 2010/0017074 A1 | 1/2010 | VerKuilen et al. | |
| 2010/0154400 A1* | 6/2010 | Krajnik | E02F 9/2235 |
| | | | 60/327 |
| 2010/0157283 A1* | 6/2010 | Kirk | G01C 15/002 |
| | | | 356/28 |
| 2010/0192720 A1* | 8/2010 | Helmer | B25J 17/0266 |
| | | | 74/490.06 |
| 2011/0083867 A1 | 4/2011 | Leith | |
| 2011/0257816 A1 | 10/2011 | Song et al. | |
| 2012/0143380 A1 | 6/2012 | Weinhardt et al. | |
| 2012/0253528 A1 | 10/2012 | Wan et al. | |
| 2013/0297046 A1* | 11/2013 | Hendron | G05B 11/01 |
| | | | 700/56 |
| 2014/0067092 A1 | 3/2014 | Cesur et al. | |
| 2015/0219108 A1 | 8/2015 | Kobayashi | |
| 2015/0266183 A1* | 9/2015 | Alifragkis | B25J 9/1692 |
| | | | 700/254 |
| 2016/0016309 A1 | 1/2016 | Swift et al. | |
| 2016/0054739 A1 | 2/2016 | Palmroth et al. | |
| 2016/0121486 A1 | 5/2016 | Lipinski et al. | |
| 2016/0281331 A1* | 9/2016 | Ikegami | E02F 9/2228 |
| 2017/0009471 A1 | 1/2017 | Friend | |
| 2018/0171580 A1* | 6/2018 | Howell | E02F 3/435 |
| 2019/0003148 A1* | 1/2019 | Andou | E02F 3/435 |
| 2019/0161939 A1* | 5/2019 | Hokkanen | E02F 9/2012 |
| 2019/0161942 A1* | 5/2019 | Hokkanen | E02F 3/434 |
| 2019/0275629 A1* | 9/2019 | Ogawa | G05B 13/0265 |
| 2019/0301131 A1 | 10/2019 | Hendron | |

FOREIGN PATENT DOCUMENTS

| | | |
|---|---|---|
| CN | 103035159 B | 4/2013 |
| CN | 105798884 A | 7/2016 |
| CN | 205817837 U | 12/2016 |
| EP | 2644780 A2 | 10/2013 |
| WO | 11003324 A1 | 1/2011 |
| WO | 11012033 A1 | 2/2011 |
| WO | 11160580 A1 | 12/2011 |
| WO | 17108455 A1 | 6/2017 |

* cited by examiner

CONVERTING MOBILE MACHINES INTO HIGH PRECISION ROBOTS

FIELD OF THE DESCRIPTION

The present description relates to converting mobile machines into high precision robots. More specifically, the present description relates to converting a mobile machine into a high precision robot by detecting a position of an end effector of the precision robot in accordance with a worksite operation.

BACKGROUND

There are many different types of work machines. Some such work machines include agricultural machines, construction machines, forestry machines, turf management machines, among others. Many of these pieces of mobile equipment have mechanisms that are controlled by the operator in performing operations. For instance, a construction machine can have multiple different mechanical, electrical, hydraulic, pneumatic and electro-mechanical subsystems, among others, all of which can be operated by the operator.

Construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders, graders, and excavators, among others. Worksite operations may involve a large number of steps or phases and may be quite complex.

Robotic heads can also be attached to work machines in order to modify or incorporate additional functionality into the work machines. By way of example, in construction operations, a robotic head with an end effector in the form of a material dispenser can replace a bucket on an excavator. Once attached, the work machine can dispense material in accordance with a worksite operation.

The discussion above is merely provided for general background information and is not intended to be used as an aid in determining the scope of the claimed subject matter.

SUMMARY

A computing system includes actuator control logic configured to generate and send control signals to an actuator of a mobile machine configured to drive direction and speed movement of a linkage on the mobile machine. The computing system also includes a control map generator system configured to receive sensor signals indicative of the direction and speed movement of the linkage on the mobile machine, and, based on the received sensor signals, generate a control mapping that maps the control signals to the direction and speed movement of the linkage of the mobile machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

In order to successfully complete a worksite operation, it may be necessary to convert a mobile machine into a high-precision robot. Such worksite operations can include forestry operations, construction operations, agricultural operations, turf management operations, etc. The robot can then be used to complete a particular, or variety, of tasks that make up the worksite operation. For example, in a forestry operation, a robotic attachment can be attached to a mobile machine, such as a harvester or excavator, and used for debarking, processing wood, felling, cut-to-length operations, etc. However, robotic attachments are often designed and manufactured to a specific type and model of mobile machine. As a result, consumers often have to buy robotic attachments specific to a mobile machine which may prove quite expensive and/or limiting in converting a mobile machine into a high-precision robot.

Additionally, upon attaching a robotic attachment to a mobile machine, it is often necessary to accurately monitor a position of an end effector on the robotic attachment to ensure accurate control. For example, in the forestry operation, an end effector of the robotic attachment may be configured to cut specific lengths of trees. To ensure proper lengths with each cut, it is important that the end effector is correctly positioned.

The present description proceeds with respect to a robotic positioning and calibration system that allows a robotic attachment to be controlled by any mobile machine to effectively convert the mobile machine into a high-precision robot. In one example, the robotic positioning and calibration system automatically learns and generates a control model made up of configuration information, kinematic information and control signal information for the mobile machine. The model is then used in controlling the attachment. However, in other examples, the control model can be made up of only a subset of this information. Regardless, using the generated control model, a robotic attachment can be controlled in a feed-forward manner when mounted on the mobile machine. In this manner, the robotic attachment can be used with substantially any mobile machine because the robotic positioning and calibration system will either automatically or semi-automatically generate a control model for the mobile machine regardless of a make and model of the mobile machine. However, it is also contemplated that the robotic attachment can be controlled in a feedback manner as well. In one example, this includes receiving sensor signals and modifying a position of the robotic attachment based on the received sensor signals. Additionally, the robotic positioning and calibration system allows for precise positioning measurements of an end effector of the robotic attachment. As a result, substantially any mobile machine may be converted into a highly-precise robot in which a position of an end-effector may be accurately monitored.

Figure 1:
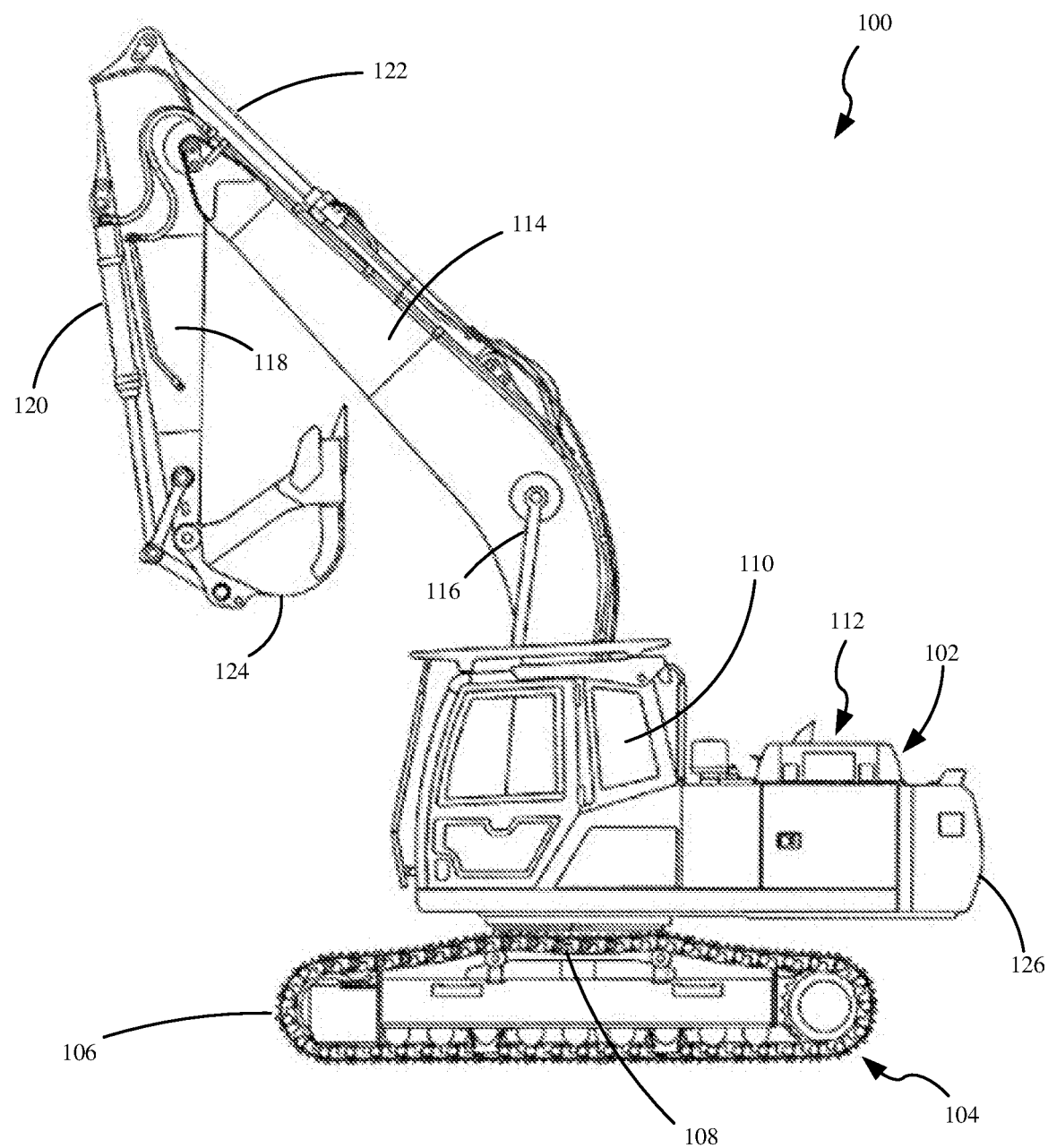
FIG. 1 is a pictorial illustration showing one example of a mobile machine with which a robotic attachment may be used.

FIG. 1 is a pictorial illustration showing one example of a mobile machine with which a robotic attachment may be used. While mobile machine 100 is illustratively shown as an excavator, it is to be understood that any mobile machine may be used in accordance with the present description.

Mobile machine 100 illustratively includes a frame 102 pivotally mounted, via a swing pivot 108, to an undercarriage 104 with tracks 106. Mobile machine 100 includes a number of linkages (e.g. a movable portion positioned between two joints) that are controlled by a number of actuators. By way of example, this can include a boom 114 and/or an arm 118 controlled by electric or hydraulic actuators (e.g. cylinders 116, 120 and 122). As illustratively shown, frame 102 includes a cab 110, an engine assembly 112, a counterweight compartment 126, boom 114 movably coupled to frame 102 via boom cylinders 116, arm 118 attached to an end of boom 114, and a bucket 124 attached to an end of arm 118. In operation, a position of arm 118, relative to boom 114, is controlled via a cylinder 122. Additionally, a position of bucket 124, relative to arm 118, is controlled via a cylinder 120. An operator in cab 110 illustratively actuates user input mechanisms to control cylinders 116, 120 and 122 as well as to control other actuators (such as to swing cab 110, to move and steer machine 100, etc.)

Figure 2:
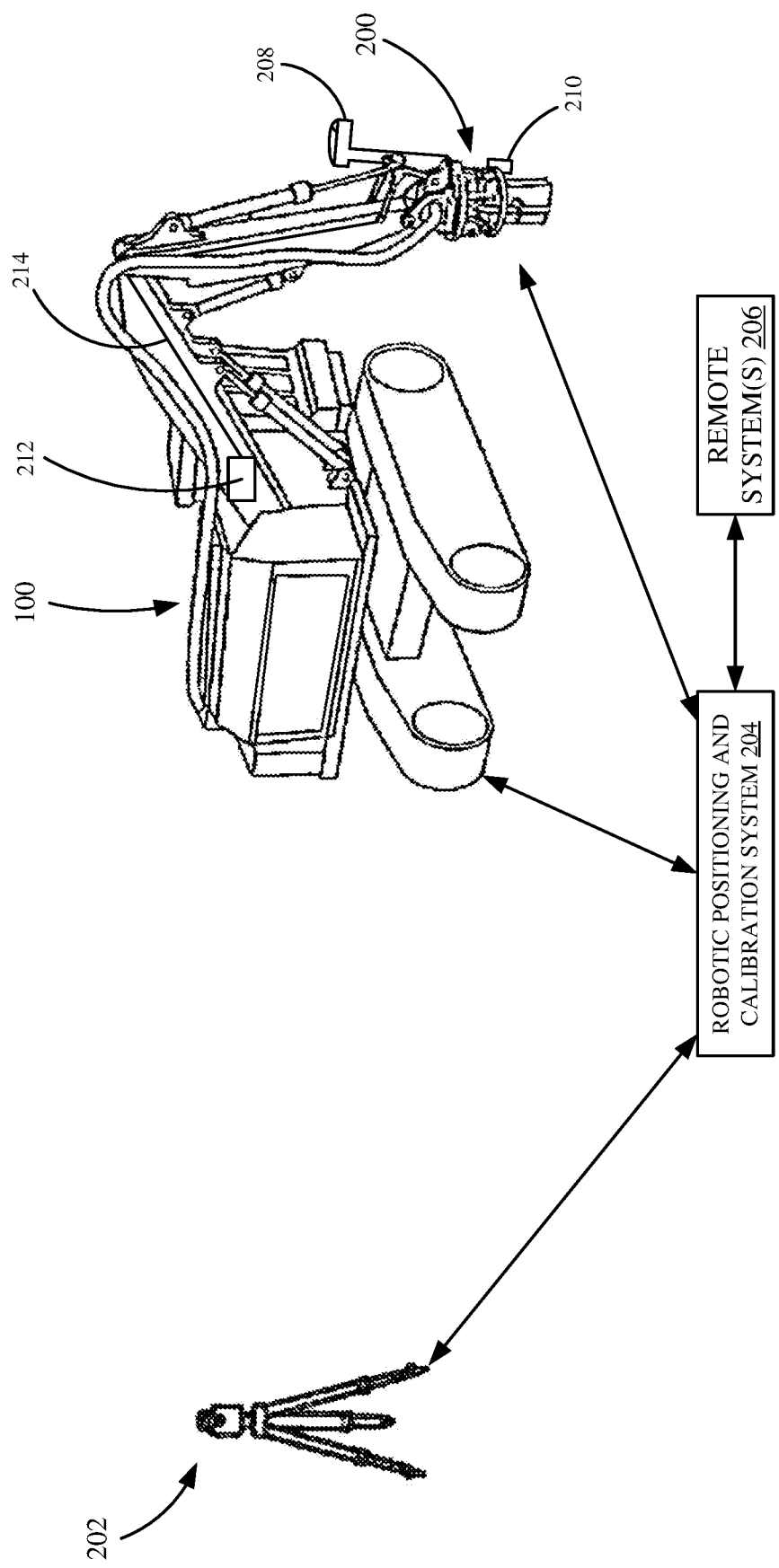
FIG. 2 is pictorial illustration showing a mobile machine architecture in which a mobile machine is coupled to a robotic attachment, a robotic positioning and calibration system, an external sensor system and a remote system.

FIG. 2 is pictorial illustration showing a mobile machine architecture in which mobile machine 100 is coupled to a robotic attachment 200, a robotic positioning and calibration system 204, an external sensor system 202, and a remote system 206. Remote system 206 can include a wide variety of different remote systems (or a plurality of remote systems) including a remote computing system accessible by the other items in FIG. 2 (e.g., by mobile machine 100, robotic attachment 200, external sensor system 202, and/or robotic positioning and calibration system 204). In operation, upon coupling robotic attachment 200 to mobile machine 100 and positioning machine 100 in a given position relative to external sensor 202, robotic positioning and calibration system 204 performs precise positioning measurements of an end effector of robotic attachment 200. In one example, these measurements are used to generate a control model for mobile machine 100. Additionally, sensor signals from sensors located on mobile machine 100 and/or robotic attachment 200 may be used as well. The various sensors will be discussed in more detail later. Briefly, however, they can include a fluid-based altimeter or altitude sensor 212 connected to robotic attachment 200 by a connector 214, rotational sensors 210 on robotic attachment 200, and/or global positioning system 208 or other position detector(s), among other types of sensors and systems.

It will be noted that, in one example, mobile machine 100 and/or robotic attachment 200 may have their own robotic positioning and calibration system 204 which can communication with one or more remote systems 206 and/or external sensor system 202. Additionally, parts of robotic positioning and calibration system 204 can be disposed on mobile machine 100, on robotic attachment 200 and/or a central system. For purposes of the present discussion, it will be assumed that robotic positioning and calibration system 204 is a system within robotic attachment 200 that allows robotic attachment 200 to convert mobile machine 100 into a highly-precise robot with an ability to precisely monitor and control a position of an end effector of robotic attachment 200 as will be discussed in further detail in FIGS. 4A-4B.

Figure 3:
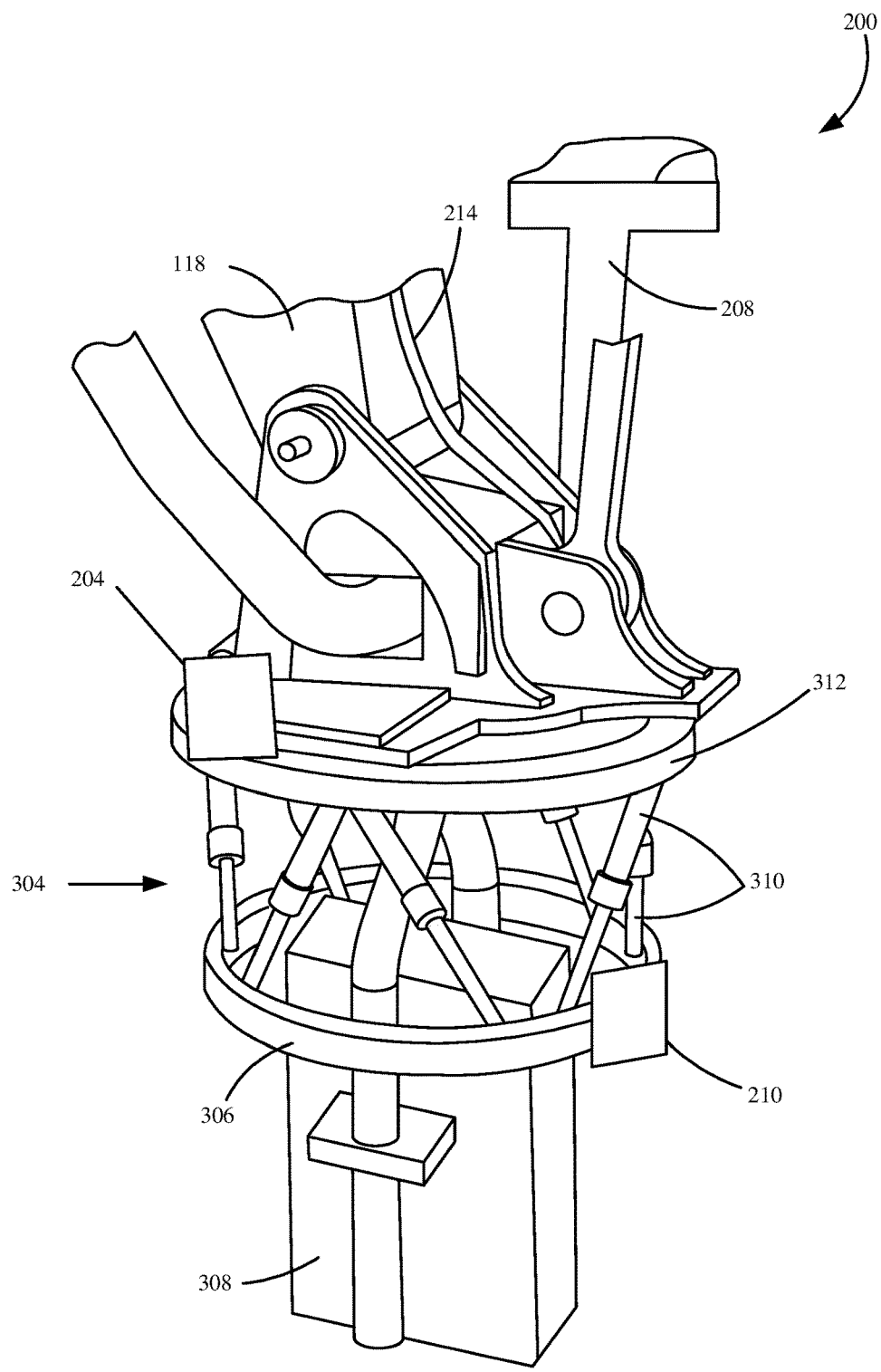
FIG. 3 is a pictorial illustration showing a robotic attachment illustrated in FIG. 2.

FIG. 3 is a pictorial illustration showing one example of a robotic attachment illustrated in FIG. 2. As illustratively shown, robotic attachment 200 includes a Stewart platform 304 coupled to arm 118 and an end effector 308, sensors 210, positioning system 208, robotic positioning and calibration system 204, and connector 214 (e.g. a tube) from sensor 212. In one example, Stewart platform 304 is a robotic platform with multiple hydraulic and/or electric cylinders 310 between a platform base 312 and a platform table 306. While robotic attachment 200 includes Stewart platform 304, with illustratively six cylinders 310, and end effector 308, in the form of a material dispenser, it is expressly contemplated that other types of robotic attachments 200 can be used in accordance with the present description, depending on a worksite operation. In operation, Stewart platform 304 allows for end effector 308 to be moved in at least one degree of freedom upon dispensing various material.

Upon coupling robotic attachment 200 to arm 118 of mobile machine 100, robotic positioning and calibration system 204 generates a control model for mobile machine 100. The control model allows robotic attachment 200 to be used with, and controlled by, mobile machine 100 regardless of a type of mobile machine. This will be discussed in detail in FIGS. 4A-4B. Briefly, however, in one example, robotic positioning and calibration system 204 begins actuating the various actuators on machine 100 and detects a direction and speed of movement (and can detect other things as well) of end effector 308 on attachment 200 in response to these actions. Based on the detected direction and speed, robotic positioning and calibration system 204 generates a control model for various linkages on mobile machine 100 controlled by the various actuator(s) (such as cylinders 116, 122 and/or 120). The control model can also be generated from other sensors located on mobile machine 100 and/or robotic attachment 200 that provide any or all configuration information, kinematic information and/or control signal information for mobile machine 100.

Figure 4A:
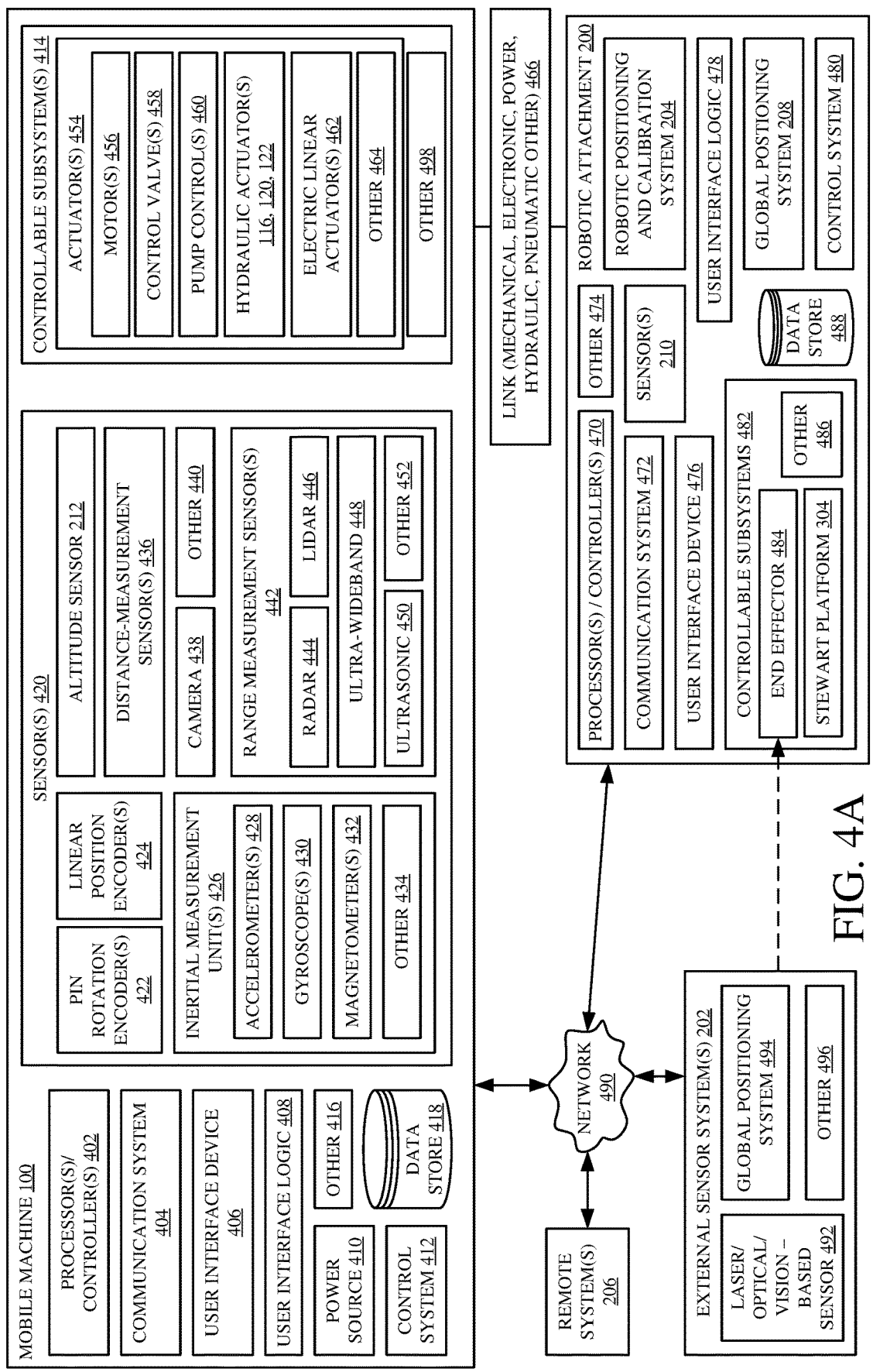
FIGS. 4A-4B are block diagrams of a mobile machine assembly which includes a mobile machine coupled to a robotic attachment via a link.
Figure 4B:
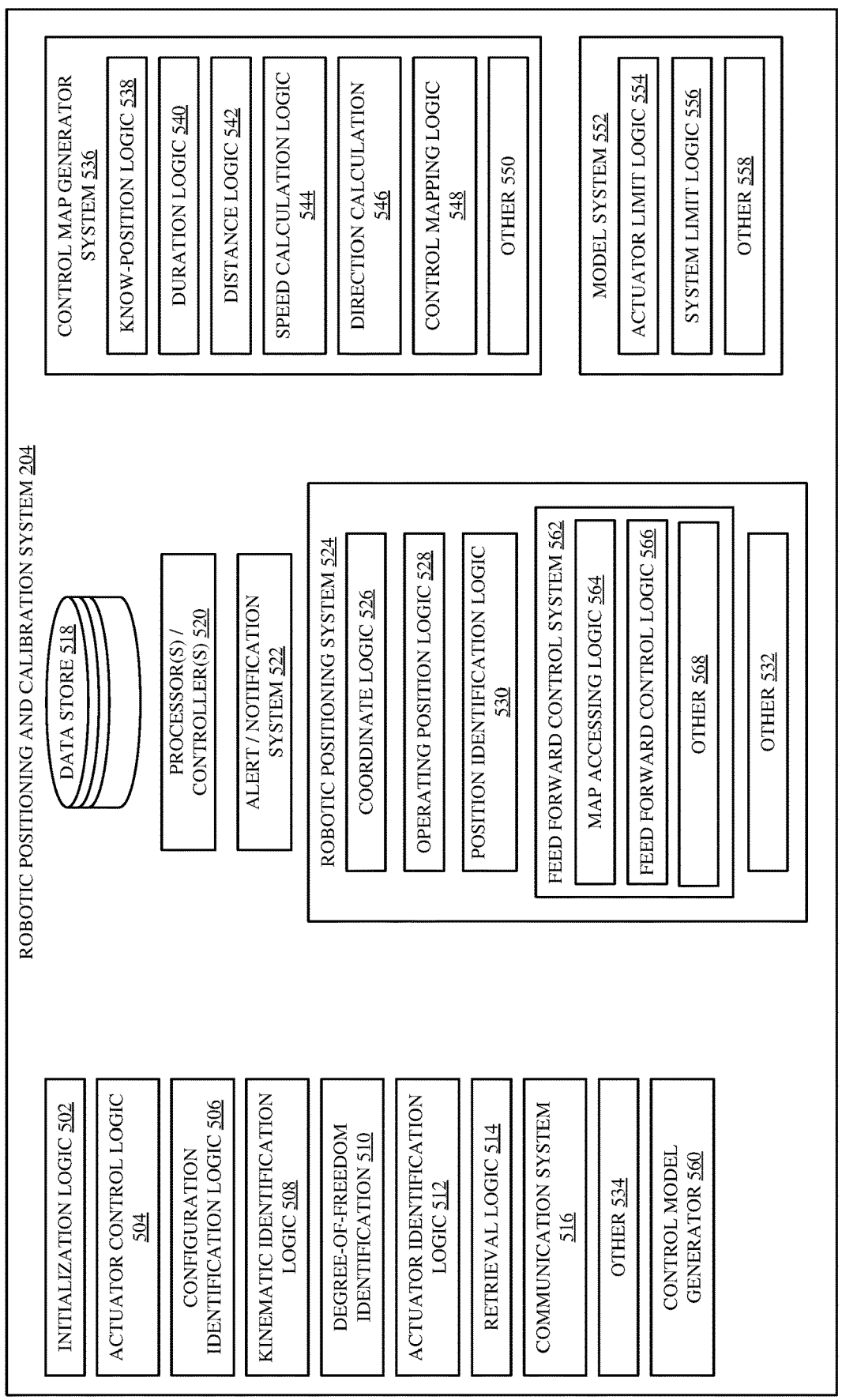
Figure 5A:
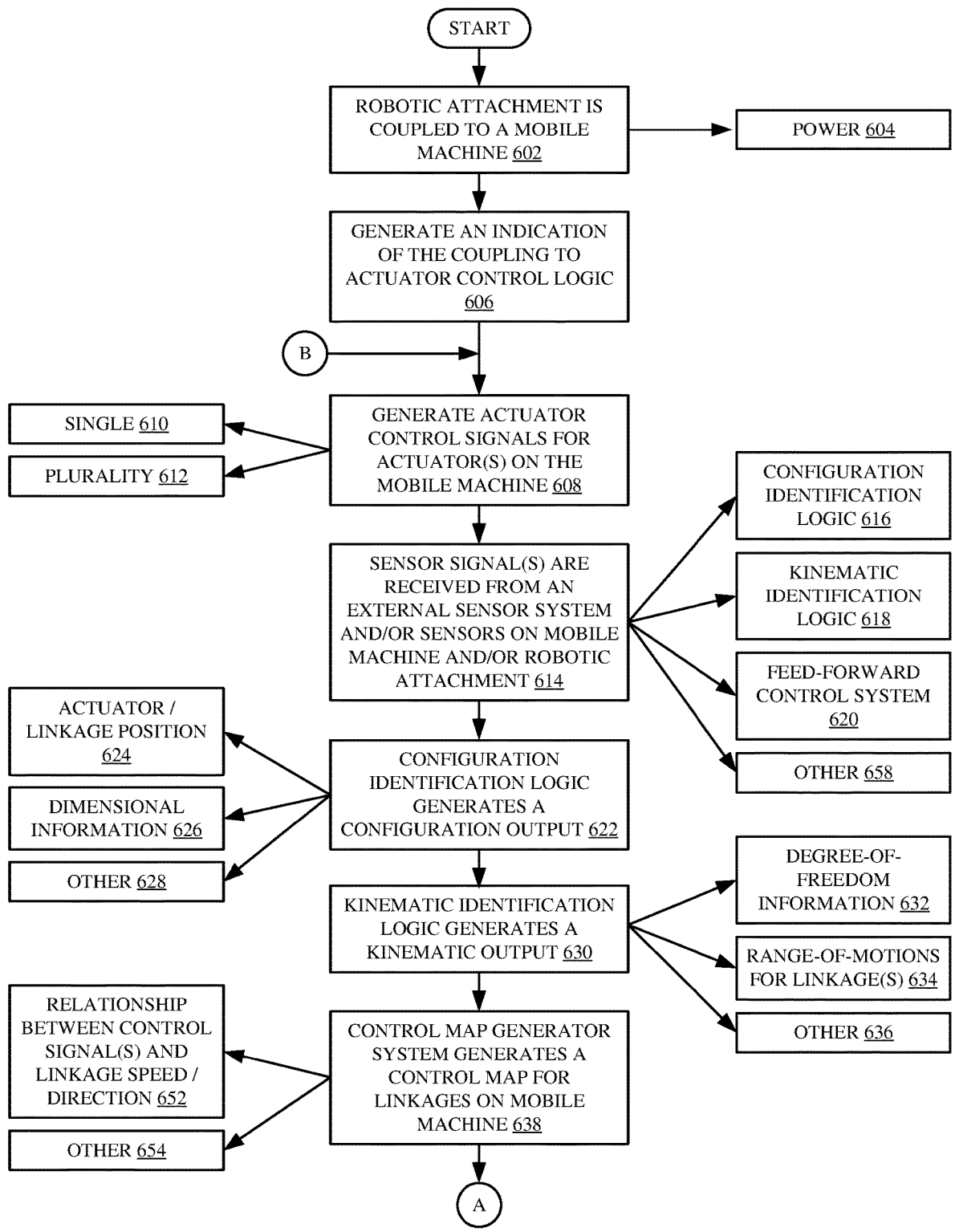
FIGS. 5A-5B are flow diagrams showing one example of generating a control model for a mobile machine using a robotic positioning and calibration system illustrated in FIGS. 4A-4B.
Figure 5B:
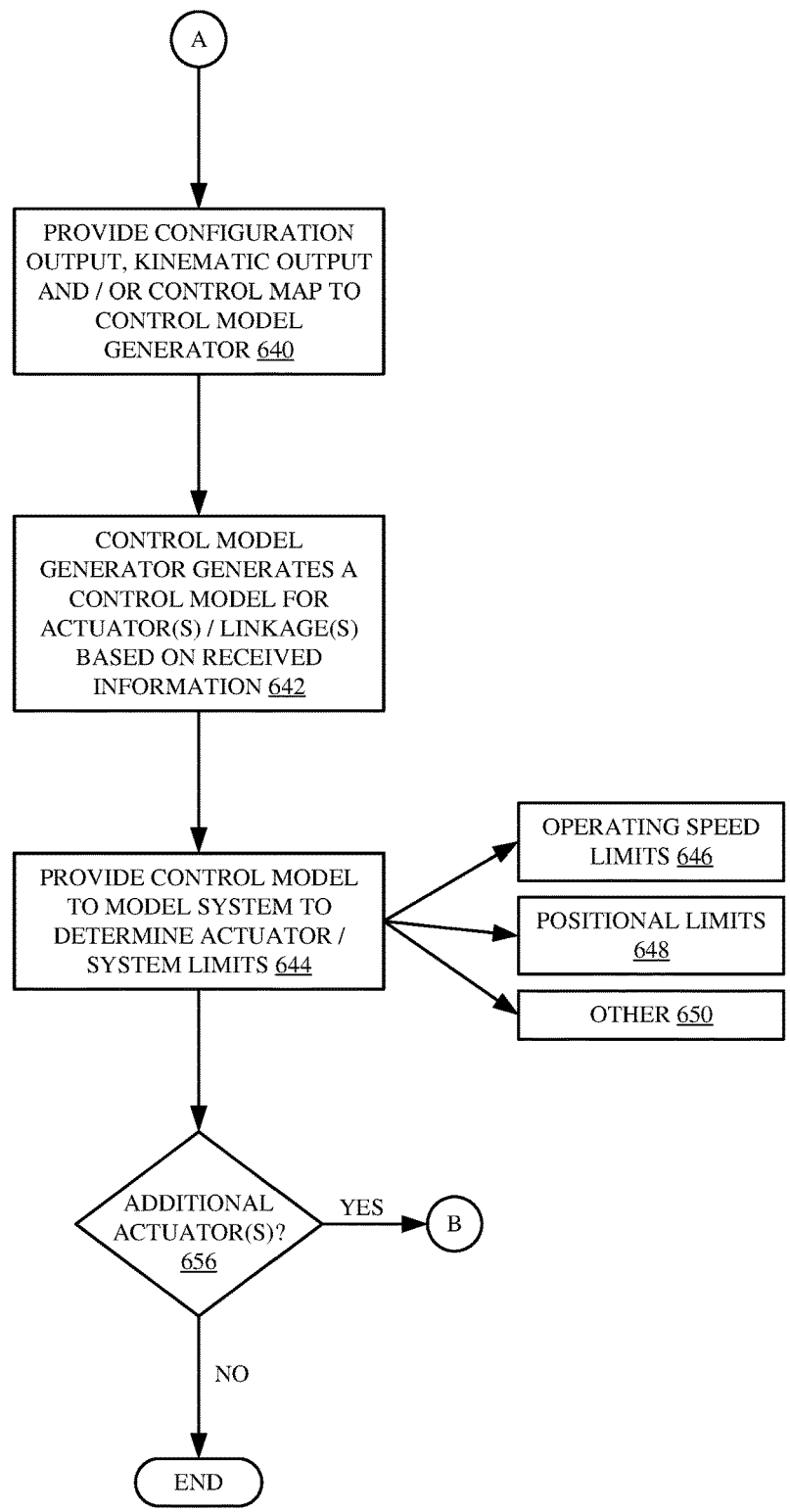

FIGS. 4A-4B are block diagrams of a mobile machine assembly which illustratively includes mobile machine 100 coupled to robotic attachment 200 via a link 466. Additionally, as illustratively shown, mobile machine 100, robotic attachment 200, external sensor system(s) 202 and remote system(s) 206 are communicatively coupled over network 490. Network 490 can be any of a wide variety of different types of networks, such as a wide area network, a local area network, a near field communication network, a cellular network, or any of a wide variety of other wired or wireless networks or combinations of networks.

Mobile machine 100 illustratively includes processor(s)/controller(s) 402, a communication system 404, a user interface device 406, user interface logic 408, a power source 410, which may be the same as, or different from, engine assembly 112 shown in FIG. 1, a control system 412, controllable subsystems 414, a data store 418, sensor(s) 420, actuator(s) 454, and a wide variety of other items 416. Before describing the operation of robotic attachment 200 and robotic positioning and calibration system 204 in more detail, a brief description of some of the items in mobile machine 100, and their operation, will first be provided.

Control system 412 can generate control signals for controlling a variety of different controllable subsystems 414, which may include actuator(s) 454, based on sensor signals generated by sensor(s) 420, based on feedback received from remote system(s) 206 or robotic positioning and calibration system 204, based on operator inputs received through user interface device 406, or it can generate control signals in a wide variety of other ways as well. Controllable subsystems 414 can also include other subsystems 498 which may include a wide variety of mechanical, electrical, hydraulic, pneumatic, computer implemented and other systems that relate to the movement of mobile machine 100, the operation that is performed, and other controllable features.

Communication system 404 can include one or more communication systems that allow components of mobile machine 100 to communicate with each other (such as over a controller-area-network (CAN) bus or otherwise) while also allowing mobile machine 100 to communicate with remote system(s) 206, external sensor system(s) 202 and/or robotic attachment 200 over network 490.

User interface device 406 can include display devices, mechanical or electrical devices (e.g., a steering wheel, joysticks, pedals, levers, buttons, etc.), audio devices, haptic devices, and a variety of other devices. In one example, user interface logic 206 generates an operator display on user interface 406 which can include a display device that is integrated into operator compartment 110 of mobile machine 100, or it can be a separate display on a separate device that can be carried by an operator (such as a laptop computer, a mobile device, etc.).

Power source 410 can be a wide variety of power sources configured to supply power to various components and subsystems within mobile machine 100 and/or robotic attachment 200. Power source 410 can include an engine, a battery, generators, alternators, etc. In operation, power source 410 may be used to provide electrical power to robotic positioning and calibration system 204 within robotic attachment 200.

Data store 418 can store any or all data pertaining to operation of mobile machine 100 and/or robotic attachment 200. In one example, data store 418 may include effector positioning data for various worksite operations, manufacturing and/or model information for mobile machine 100, and actuator/sensor information that is accessible by robotic attachment 200 among a variety of other data. In one example, actuator data can include extreme operating position data for actuator(s) 454 and/or linkages (which indicates positions of the actuators or linkages at the extreme extent of their movement), among a variety of other data. In one example, data within data store 418 can be used by robotic positioning and calibration system 204 to correctly position robotic attachment 200 to perform a worksite operation and generate a control model for mobile machine 100 as will be discussed further in FIG. 4B.

Actuator(s) 454 can include a wide variety of different types of actuator(s) configured to receive a control signal and elicit linkage motion on mobile machine 100 and/or a transport of mobile machine 100. Actuator(s) can include motor(s) 456, control valve(s) 458, pump control(s) 460, hydraulic actuator(s) 116, 120, 122 (shown in FIG. 1), electric linear actuator(s) 462, among a variety of other actuators 464. In operation, upon receiving a control signal, actuator(s) 454 can drive linkage movement and/or a transport of mobile machine 100 which may include movement of boom 114, arm 118, frame 102 and/or an end effector such as bucket 124 or end effector 308, among a variety of other linkages. They can also be used to drive positioning of robotic attachment (or robotic head) 200.

Sensor(s) 420 generate sensor signals which can be used by robotic positioning and calibration system 204 to accurately determine a position of robotic attachment 200 and/or mobile machine 100 and generate a control model for mobile machine 100. For example, sensor(s) 420 can sense linkage motion on mobile machine 100, and/or a transport of mobile machine 100, and can generate signals indicative of the sensed linkage motion and/or transport of mobile machine 100. From the provided sensor signal(s), robotic positioning and calibration system 204 can determine which actuator(s) 454 control various linkages, a configuration of mobile machine 100, kinematics of various linkages, actuator 454 and/or system limits, and generate a control map for the linkages (which maps inputs to speed and direction of linkage movement) as will be discussed in FIG. 4B.

Sensor(s) 420 can include pin rotation encoder(s) 422, linear position encoder(s) 424, inertial measurement unit(s) 426, altitude sensor 212, distance-measurement sensor(s) 436, camera(s) 438, and range measurement sensor(s) 442, among a wide variety of other sensor(s) 440. In one example, sensor(s) 420 may already be present on mobile machine 100 after manufacture, or, alternatively, added to mobile machine 100 at a later time. In one example, inertial measurement unit(s) 426 can include accelerometer(s) 428, gyroscope(s) 430, magnetometer(s) 432, among a variety of other sensors. Additionally, range measurement sensor(s) 442 can be radar-based sensors 444, LIDAR-based sensors 446, ultra-wideband radiation sensors 448, ultrasonic radiation sensors 450, among a variety of other sensor(s) 452.

In operation, mobile machine 100 is coupled to robotic attachment 200 via one or more links 466. Links 466 can include a mechanical linkage so that robotic attachment 200 is physically coupled to mobile machine 100. It can also include other links (such as a cable harness, wireless links, etc.) for transmitting electronic data, power, hydraulic fluid under pressure, pneumatic power, or a wide variety of other things.

Now turning to robotic attachment 200, robotic attachment 200 illustratively includes processor(s)/controller(s) 470, communication system 472, user interface device 476, user interface logic 478, control system 480, controllable subsystems 482, data store 488, global positioning system 208, robotic positioning and calibration system 204, sensor(s) 210, among a variety of other components 474. Before going into more detail into robotic positioning and calibration system 204, a brief description of some of the items in robotic attachment 200, and their operation, will be provided.

Control system 480 of robotic attachment 200 can generate control signals for controlling a variety of different controllable subsystems 482, which, in one example, can include end effector 484 (which can also be end effector 308 discussed above) and/or Stewart platform 304. However, controllable subsystem(s) 482 can include a wide variety of mechanical, electrical, hydraulic, pneumatic, computer implemented and other systems 486 of robotic attachment 200 that relate to the movement of robotic attachment 200, the operation that is performed, and other controllable features. Control system 480 can generate control signals based on received sensor signals, based on feedback received from mobile machine 100, remote system(s) 206, external sensor system(s) 202, robotic positioning and calibration system 204, based on operator inputs received through user interface device 476, or it can generate control signals in a wide variety of other ways as well.

Communication system 472 can include one or more communication systems that allow components of robotic attachment 200 to be communicatively coupled to each other while also allowing robotic attachment 200 to be communicatively coupled to mobile machine 100. In other examples, communication system 472 allows robotic attachment 200 to communicate with mobile machine 100, external sensor system(s) 202 and/or remote system(s) 206 over network 490. User interface device 476 can include display devices, mechanical or electrical devices, audio devices, haptic devices, and a variety of other devices. In one example, user interface device 476 allows an operator of mobile machine 100 to interact with robotic attachment 200 to change various operating parameters (e.g. from the operating compartment of mobile machine 100), which, in one example, may include a specific end effector operating parameter. Based on a received user input, user interface logic 478 can generate an indication of the received user input to control system 480.

Data store 488 can store any or all data pertaining to operation of robotic attachment 200 and/or data pertaining to mobile machine 100. In one example, data store 488 may include effector positioning data for various worksite operations, among a wide variety of other data. Additionally, data within data store 488 may be indexed based on a particular worksite operation; however, other indexes may be used as well. In operation, data within data store 488 may be used by robotic positioning and calibration system 204 to correctly position end effector 484 and/or generate a control model for mobile machine 100 as will be discussed later.

Sensor(s) 210 generate sensor signals which can be used by robotic positioning and calibration system 204 to generate a control model for mobile machine 100 and/or correctly position robotic attachment 200 using the control model. In one example, sensor(s) 210 can include tilt sensor(s) and/or inertial measurement unit(s) to determine a roll, pitch and/or yaw of Stewart platform 304, end effector 484, among other components of robotic attachment 200. However, a wide variety of other sensor(s) may be used as well. Additionally, robotic attachment 200 includes positioning system 208 which can be one or more of a global positioning system (GPS) receiver, a LORAN system, a dead reckoning system, a cellular triangulation system, or other positioning system that enables robotic positioning and calibration system 204 to determine positional information for robotic attachment 200. This may include x-axis, y-axis and z-axis coordinate information, or a system that derives the position of robotic attachment 200 from the position of machine 100, as an example.

Robotic positioning and calibration system 204 converts mobile machine 100 into a robotic platform while accurately monitoring a position of robotic attachment 200 which, in one example, includes end effector 484. This will be discussed in detail in FIG. 4B. However, briefly, robotic positioning and calibration system 204 determines and generates a control model that, in one example, includes configuration information, kinematic information and control signal information for mobile machine 100. Based on the control model, robotic attachment 200 can be controlled in a feed-forward manner by mobile machine 100 to perform a worksite operation. Additionally, because the control model is generated by robotic positioning and calibration system 204, robotic attachment 200 may be coupled to any mobile machine 100 and robotic positioning and calibration system 204 will either automatically or semi-automatically generate a control model for the mobile machine. It is also contemplated that robotic positioning and calibration system 204 can control robotic attachment 200 through a feedback control system as well. Additionally, based on received sensor signals, robotic positioning and calibration system 204 can accurately position end effector 484 to perform the worksite operation, using the control model.

In one example, external sensor system(s) 202 are configured to provide positional information indicating a position of robotic attachment 200 to robotic positioning and calibration system 204. External sensor system(s) 202 may include a laser system (or other optical or image-based system) 492, a global positioning system 494 with real time kinematic functionality, among a wide variety of other systems 496. In one example, optical based system 492 may include the use of cameras, infrared radiation, LIDAR, total stations with prisms, and other similar devices. In operation, positional information generated from external sensor system(s) 202 are received by robotic positioning and calibration system 204 and used to accurately monitor a position, direction and speed of robotic attachment 200 which includes end effector 484. This can be used to generate the control model and to control end effector 484 during operation.

FIG. 4B is a block diagram showing one example of a robotic positioning and calibration system 204 in more detail. Robotic positioning and calibration system 204 illustratively includes initialization logic 502, actuator control logic 504, configuration identification logic 506, kinematic identification logic 508, degree-of-freedom identification logic 510, actuator identification logic 512, retrieval logic 514, communication system 516, control model generator 560, data store 518, processor(s)/controller(s) 520, alert/notification system 522, robotic positioning system 524, control map generator system 536, model system 552, and it can include a variety of other systems and components 534. Data store 518 can store any or all data pertaining to operation of mobile machine 100 and/or robotic attachment 200. This can be the same as, or different from, data stores 418 and 488.

Robotic positioning and calibration system 204 is configured to generate a control model for mobile machine 100 allowing robotic attachment 200 to be controlled in a feed-forward manner. For example, robotic positioning and calibration system 204 determines and monitors a position of robotic attachment 200 in response to different actuator signals so the model can be generated and used during operation. Then, using the developed control model, specific actuators of mobile machine 100 can be controlled to elicit desired linkage motion therein adjusting a position of robotic attachment 200. However, a feedback control system may be used as well.

In one example, a control model can include configuration information, kinematic information, and control signal information among a wide variety of other information generated based on received sensor signal(s) from external sensor system 202 and/or sensor(s) 410, 210. While the present description will mention obtaining configuration, kinematic and control signal information, it is to be understood that, in other examples, a generated control model may only contain a subset of this information, or it may include additional or different information.

In operation, upon coupling robotic attachment 200 to mobile machine 100, initialization logic 502 is configured to sense the coupling and generate an indication of the coupling to actuator control logic 504. Upon receiving the indication, actuator control logic 504 may then automatically generate actuator control signals, over communication system 516, to control actuator(s) 454 of mobile machine 100. However, it is also expressly contemplated that actuator control logic 504 can generate control signals in response to a received user input, among a variety of other manual inputs. Actuator(s) 454, in response to the received control signals, drive linkage movement on mobile machine 100 which may include movement of boom 114, arm 118, among a variety of other linkages.

In response to the linkage motion, sensor signals may be generated by external sensor system 202 and/or sensor(s) 210, 420, which may sense movement of the linkage, and which are used by robotic positioning and calibration system 204 to identify configuration information, kinematic information, and/or information indicative of the speed and direction of movement of a linkage in response to the actuator control signals. For example, sensor signals may be received by configuration identification logic 506 and used to determine a physical configuration of mobile machine 100, or robotic attachment 200, or both. Configuration information may include a location of actuator(s) 454 and/or sensor(s) 420 on mobile machine 100, an arrangement of linkages, dimensional information, among a wide variety of other information. Additionally, sensor signal(s) can be received by kinematic identification logic 508 and used to identify kinematics for a particular actuator/linkage or for all actuators and linkages. This can include information pertaining to a range of motions for each linkage relative to the rest of mobile machine 100. Configuration and kinematic outputs may then be generated by configuration identification logic 506 and kinematic identification logic 508, respectively, and provided to control model generator 560.

Additionally, degree-of-freedom identification logic 510, based on the identified kinematic information, can determine a number of degrees-of-freedom for each linkage of mobile machine 100 and for robotic attachment 200. It is also contemplated that an operator may provide this information and other kinematic information through a user-input as well. In one example, a user-input can be received through user interface device 406 of mobile machine 100 and provided to robotic positioning and calibration system 204. Furthermore, actuator identification logic 512 can identify a number of actuator(s) 454 on mobile machine 100. For example, actuator identification logic 512 can utilize retrieval logic 514 to obtain machine data, that identifies a number of actuator(s) on mobile machine 100, from remote system(s) 206 and/or data stores 418, 488 and/or 518. An indication can be provided from actuator identification logic 512 to actuator control logic 504 to ensure control signals are communicated to every actuator 454 on mobile machine. However, machine information indicating a number of actuator(s) may also be provided through a user-input as well.

While received sensor signals from external sensor system 202 and/or sensor(s) 210, 420 can be used to generate information for a control model, it is also expressly contemplated that any or all pre-existing information pertaining to a configuration, kinematics, and/or control of mobile machine 100 and robotic attachment 200 can be used by robotic positioning and calibration system 204 in developing a control model for mobile machine 100. For example, an operator can input the particular mobile machine make and model, or it can be sensed. Then retrieval logic 514 can obtain information from remote system(s) 206 and/or data stores 418, 488 and 518 relating to the particular mobile machine's configuration, kinematics, and/or control signal information. The retrieved information may be used by control model generator 560 to generate a control model for mobile machine 100, so that the information need not be generated.

In addition to detecting or obtaining configuration information and kinematic information for mobile machine 100, robotic positioning and calibration system 204 also determines control signal information for mobile machine 100. In one example, control signal information includes a relationship between actuator control signals, generated by actuator control logic 504, and a corresponding linkage speed and/or direction for an identified linkage on mobile machine 100. For example, using control map generator system 536 of robotic positioning and calibration system 204, a control map can be generated that maps an actuator control signal to a linkage speed/direction on mobile machine 100.

To do this, in one example, control map generator system 536 includes known-position logic 538, duration logic 540, distance logic 542, speed calculation logic 544, direction calculation logic 546, control mapping logic 548, among a variety of other logic 550. In order to accurately map the actuator control signals to corresponding linkage speed and/or direction, control map generator system 536 can carry out various tests to determine the relationship. Additionally, in one example, based on the tests, control map generator system 536 can generate a control map for each degree-of-freedom of every linkage on mobile machine 100. In another example, the maps may just map a control signal to movement (speed, direction) of the end effector. While two different methods will be mentioned, it is contemplated that a variety of methods can be used to determine the relationship between the control signals and linkage speed and/or direction.

In one example, known-position logic 538 initially obtains information identifying extreme operating positions for linkages and/or actuator(s) 454 of mobile machine 100. While extreme operating positions for linkages will be mentioned, it is contemplated that a variety of other positional information, that defines a known position for a linkage, can be used instead. Using retrieval logic 514, known-position logic 538 can access information from remote system(s) 206 and/or data stores 418, 488, and 518 to determine the extreme operating positions, at each degree-of-freedom, for linkages of mobile machine 100. Additionally, positional information may also be provided through a user-input as well. Regardless, upon receiving positional information, actuator control logic 504 receives the information and generates a control signal to control actuator(s) 454 to position the linkage at one extreme operating position (e.g. with actuator 454 fully extended). After which, a subsequent control signal is generated by actuator control logic 504 to control actuator(s) 454 to position the linkage at a second extreme position (e.g. with actuator 454 fully contracted).

Sensor signals are then received from external sensor system(s) 202 and/or sensor(s) 210, 420 indicative of a linkage motion (direction and speed of movement) between the first extreme operating position and the second extreme position. For instance, where external sensor system 202 has a laser sensor or other optical or vision-based sensor system, the position of the end of the linkage being moved can be tracked in space against a three-dimensional, global coordinate system. This type of tracking can provide both a speed and direction of movement of the end of the linkage in response to the actuator control signal. Based on the received sensor signal(s), control map generator system 536 generates a control map that maps the generated actuator control signals to a corresponding linkage speed and/or direction. It will again be noted that the first and second positions need not be the extreme positions, so long as they are known positions or positions that can be derived along the extent of travel of the linkage.

In one example, sensor signals from external sensor system 202 can be received by duration logic 540, of control map generator system 536, indicating a duration of time that the linkage was moving from the first extreme position to the second extreme position. Upon receiving the sensor signals, duration logic 540 can generate a duration output indicating the duration of time. Additionally, distance logic 542 can receive sensor signals from external sensor system 202 indicating a distance between the extreme positions and can generate a distance output. Speed calculation logic 544 can then receive the duration and distance output from duration and distance logic, respectively, and can calculate a linkage speed. Additionally, direction calculation logic 546 can receive sensor signals from external sensor system 202 indicating a direction the linkage was moving from the first extreme position to the second extreme position relative to a fixed coordinate system. Upon receiving the sensor signals, direction calculation logic 546 can generate a direction output. A speed and/or direction output is then provided to control mapping logic 548 which maps an actuator control signal to the linkage speed and/or direction of movement. An output can then be provided to control model generator 560. This can be repeated for each linkage degree-of-freedom and for each actuator(s) 454 and linkage on mobile machine 100 and robotic attachment 200. Additionally, this may also be repeated for various loads on actuator(s) 454.

Alternatively, a second way to map a control signal to a linkage speed/direction similarly involves using known-position logic 538 to, initially, place a linkage at one extreme position. Subsequently, control signal(s) can be generated by actuator control logic 504 to operate actuator(s) 454, corresponding to the linkage, at a full operating capacity. Sensor signal(s) indicative of a linkage speed and/or direction can then be provided to speed calculation logic 544 and/or direction calculation logic 546, respectively. Upon receiving sensor signal(s), speed calculation logic 544 and direction calculation logic 546 calculate a speed and direction, respectively, for the linkage of mobile machine 100.

The speed and direction outputs may then be provided to control mapping logic 548 in order to map the actuator control signal, generated by actuator control logic 504, to the linkage speed and direction. A control map may then be provided to control model generator 560.

With any or all of the received configuration, kinematic and/or control signal information, control model generator 560 can generate a control model for mobile machine 100. For instance, control model generator 560 can aggregate the mappings that map a control signal to multiple linkage movements to obtain a map between the control signal and movement of the end effector. Also, control model generator 560 can generate a reverse map that maps from a given position or desired movement of the end effector to the control signal (or combination or sequence of control signals) needed to move the end effector from a current position to the given position or to obtain the desired movement (speed/direction) of the end effector. Additionally, in some examples, control model generator 560 can use the control signal information from control mapping logic 548 to verify received configuration and/or kinematic information from configuration identification logic 506 and kinematic identification logic 508, respectively. Once the control model is generated, a feed-forward method of controlling robotic attachment 200 can be used. This is described in greater detail below.

Additionally, robotic positioning and calibration system 204 also includes model system 552 configured to determine actuator and/or system operating limits. Model system 552 includes actuator limit logic 554, system limit logic 556, among a variety of other logic 558.

Actuator limit logic 554 is configured to determine a speed limit for actuator(s) 454 based on determined configuration, kinematic and/or control signal information. In one example, actuator limit logic 554 determines speed limits at each degree-of-freedom for each actuator(s) 454. Additionally, system limit logic 556 determines system limitations based on the received information which can include whether multiple linkages can be positioned simultaneously, a maximum operating position for individual linkages, etc. In operation, if a user input specifies an actuator or system operating parameter beyond the calculated limits, alert/notification system 522 can generate an indication of the exceeded actuator and/or system limit. This can include a user interface display or other alert.

In addition to generating a control model for mobile machine 100, robotic positioning and calibration system 204 also monitors and changes a position of robotic attachment 200, including end effector 484, based on a desired position of end effector 484. In one example, a position of end effector 484 can be changed using the generated control model from control model generator 560. Robotic positioning system 524 of robotic positioning and calibration system 204 includes coordinate logic 526, operating position logic 528, position identification logic 530, feed forward control system 562, among other logic 532.

It will now be assumed robotic positioning and calibration system 204 determines a position of robotic attachment 200 using external sensor system 202, however, this is but one example. In operation, coordinate logic 526 can determine a reference coordinate frame for robotic attachment 200 based on an intended operation of robotic attachment 200 in which the reference coordinate frame may be global or local to mobile machine 100. Position identification logic 530 receives sensor signals from external sensor system(s) 202 and can identify a current position of end effector 484 and/or other components of robotic attachment 204 (such as Stewart platform 304) within the coordinate system. Based on an identified current position, and a desired position as determined by operating position logic 528, a current position of end effector 484 can be modified using feed forward control system 562 which is configured to move end effector 484 from the current position to the desired position using the generated control model, as will be discussed in detail later.

Additionally, robotic positioning system 524 can determine a position of robotic attachment 200 using information provided from sensor(s) 210, 420. For example, sensor(s) 210 on robotic attachment 200 may include tilt sensor(s) and/or inertial measurement units on Stewart platform 304 that generate sensor signals indicative of a roll, pitch and yaw of Stewart platform 304. Acceleration and gyroscope information may also be obtained from the inertial measurement units and used by robotic positioning system 524 as well. Based on the received sensor signals, position identification logic 530 can determine a rotational position of Stewart platform 304 and/or other components of robotic attachment 200 relative to the frame and position of mobile machine 100.

In another example, sensor(s) 420 on mobile machine 100 may include a fluid-based altimeter 212 that generates sensor signals indicative of a height (z-coordinate position) of robotic attachment 200. For example, fluid-based altimeter 212 can be attached to connector 214 (e.g., a flexible tube or hose 214), extending from altimeter 212 along a linkage of mobile machine 100. In one example, tube 214 contains a liquid and extends from altimeter 212 along boom 114 and arm 118. In operation, altimeter 212 can measure a differential column of fluid height between the two ends of connector 214 and can generate an indication of the height difference to position identification logic 530. Position identification logic 530, in accordance with Pascal's principle, determines a height of end effector 484 based on the received indication and based on a known height of altimeter 212. It is also contemplated that a position of robotic attachment 200 may also be determined using global positioning system 208 by calculating a geographic offset between system 208 and end effector 484 of robotic attachment 200 using learned or known kinematics.

One example of operating position logic 528 will now be described. Based on a worksite operation, operating position logic 528 determines a desired position for robotic attachment 200. In one example, a received user input may specify the desired position in which operating position logic 528 maps the received user input to a desired position. Alternatively, a user input may specify a worksite operation, and operating position logic 528 can use retrieval logic 514 to obtain positional information that indicates where end effector 484 should be positioned to perform the worksite operation. Operating position logic 528 thus determines the desired position for robotic attachment 200 and generates a desired position output.

Feed forward control system 562 receives the position output from position identification logic 530 and the desired position output from operating position logic 528 and generates control signals to control actuator(s) 454 to position robotic attachment 200 at the desired position using the generated control model. However, in some examples, the desired position output may only indicate a general positional change for robotic attachment 200, in which case only the desired position output may be received prior to generating actuator control signals (e.g., a received user input through a joystick, analog stick, etc.).

Feed forward control system 562 includes map accessing logic 564, feed forward control logic 566, and it can include a variety of other logic 568. In one example operation, feed forward control logic 566 receives both the position output and the desired position output and uses map accessing logic 564 to access information from the generated control model in order to determine various actuator control signals that will effectively position robotic attachment 200, including end effector 484, at the desired position. This can include actuator control signals for a single actuator or variety of actuator(s) 454 that drive one or multiple linkages within mobile machine 100 depending on the desired position. Upon determining the necessary control signals to position robotic attachment 200 at the desired position, feed forward control logic 564 can control actuator control logic 504 to generate actuator control signals for actuator(s) 454 of mobile machine 100. In one example, feed forward control system 562 can receive sensor signal(s) from external sensor system 202 and/or sensor(s) 210, 420 to determine whether robotic attachment 200 is correctly positioned at the desired position. Based on the determination, feed forward control logic 566 can use map accessing logic 564 to determine a different control sequence, notify an operator through a generated user interface display, or make control map generator system 536 again map actuator control signals to a linkage speed and/or direction.

FIGS. 5-9 are flow diagrams showing example operations of robotic positioning and calibration system 204 illustrated in FIG. 4B. The operation shown in FIGS. 5A-5B is one example of generating a control model for mobile machine 100 using robotic positioning and calibration system 204. While it is discussed in the context of generating configuration, kinematic and control signal information, additional or different data can also be gathered as well. Additionally, while the operations in FIGS. 5A-9 are carried out, or initiated, upon physically coupling robotic attachment 200 to mobile machine 100, they can be carried out at any time or at any point throughout a worksite operation, or even if a worksite operation is not currently underway. Further, while the operation will be described in accordance with mobile machine 100 and robotic attachment 200, it is to be understood that other mobile machines and robotic attachments can be used as well.

Processing begins at block 602 where robotic attachment 200 is coupled to mobile machine 100 using link 466. In one example, upon being physically coupled to mobile machine 100, robotic attachment 200 receives power from mobile machine 100 as indicated by block 604. Processing then turns to block 606 where initialization logic 502 detects that the machine and attachment have been coupled together and sends an indication of the coupling between mobile machine 100 and robotic attachment 200 to actuator control logic 504. Actuator control logic 504, upon receiving the indication, can automatically generate actuator control signal(s) for actuator(s) 454 of mobile machine 100 as indicated by block 608. In one example, actuator control signals can be generated for a single actuator, as indicated by block 610, or a plurality of actuators as indicated by block 612. Even without knowing which actuators are controlled by which signals, or how they are controlled, or what motion will occur based on the actuating actuator, control logic 504 can begin controlling actuators 454 and the unknown information is learned.

In response to the received actuator control signals, actuator(s) 454 drive linkage motion on mobile machine. This can include boom 114, arm 118, etc. In response to the linkage motion, processing turns to block 614 where sensor signal(s) are received from external sensor system 202 and/or sensor(s) 210, 420 indicative of which linkages are moving and the particular linkage motion that is occurring. In one example, sensor signal(s) generated by sensors 202, 210, 420 can be received by configuration identification logic 506, as indicated by block 616, kinematic identification logic 508, as indicated by block 618, and control map generator system 536 as indicated by block 620. However, other components can receive the sensor signals as well as indicated by block 658. It will now be assumed that configuration identification logic 506, kinematic identification logic 508, and control map generator system 536 receive sensor signals, but it is to be understood that only a subset may receive sensor signals in other examples. Regardless, in this example, processing turns to block 622 where configuration identification logic 506 generates a configuration output. The configuration output can include actuator/linkage position and/or dimensional information that identifies the dimensions of the linkages that are moving, as indicated by block 624. It can include mobile machine 100 dimensional information that identifies various dimensions of machine 100, as indicated by block 626, among a wide variety of other configuration information as indicated by block 628.

Processing then turns to block 630 where kinematic identification logic 508 generates a kinematic output for mobile machine 100. The kinematic output may include degree-of-freedom information that identifies a number of independent ways by which linkages of mobile machine 100 can move, as indicated by bock 632, a range of the different motions for linkages of mobile machine 100, as indicated by block 634, among a variety of other kinematic information as indicated by block 636. Upon generating a kinematic output, processing turns to block 638 where control map generator system 536 generates a control map for the corresponding linkages of mobile machine 100. In one example, a control map includes a map that maps a control signal generated by actuator control logic 504 to a corresponding linkage speed and/or direction, as indicated by block 652. Thus, system 204 learns, for that particular actuator control signal, which linkages will move whether on the machine or the attachment or both, and their direction, speed and extent of movement. It can also learn the dimensions of the various linkages, the configuration and dimensions of the machine and attachment, among other things. However, a variety of other information may be included with the control map as indicated by block 654. Generating the control map will be discussed further with respect to FIGS. 6-7.

Once a configuration output, kinematic output and control map are generated, processing turns to block 640 where the outputs and/or control map are provided to control model generator 560 as indicated by block 640. Based on the received configuration, kinematic and control map information, control model generator 560 generates a control model for mobile machine 100 as indicated by block 642. While a control model is generated based on the received configuration information, kinematic information and control map, it is expressly contemplated that, in other examples, only some of this information may be generated and subsequently provided to control model generator 560 and used to generate a control model. The generated control model, in one example, allows mobile machine 100 to control robotic attachment 200 using feed forward control system 562.

Upon generating a control model, processing turns to block 644 where the generated control model is received by model system 552 and used by model system 552 to determine actuator and/or system limits if they are not already known. In one example, actuator and/or system limits may include operating speed limits, as indicated by block 646, positional limits, as indicated by block 648, or any other limit information as indicated by block 650.

Processing then turns to block 656 where a determination is made by actuator identification logic 512 whether there are additional actuator(s) 454 of mobile machine 100 for which mappings have yet to be learned. If so, processing turns back to block 608 where additional actuator control signal(s) are generated using actuator control logic 504. If not, processing subsequently ends. It will also be noted that mappings can be generated that map control inputs (which simultaneously actuate multiple actuators such as left, swing, tilt, etc.) to movement of end effector 484 (speed, direction, magnitude or distance, etc.). The control model can incorporate these mappings as well.

Figure 6A:
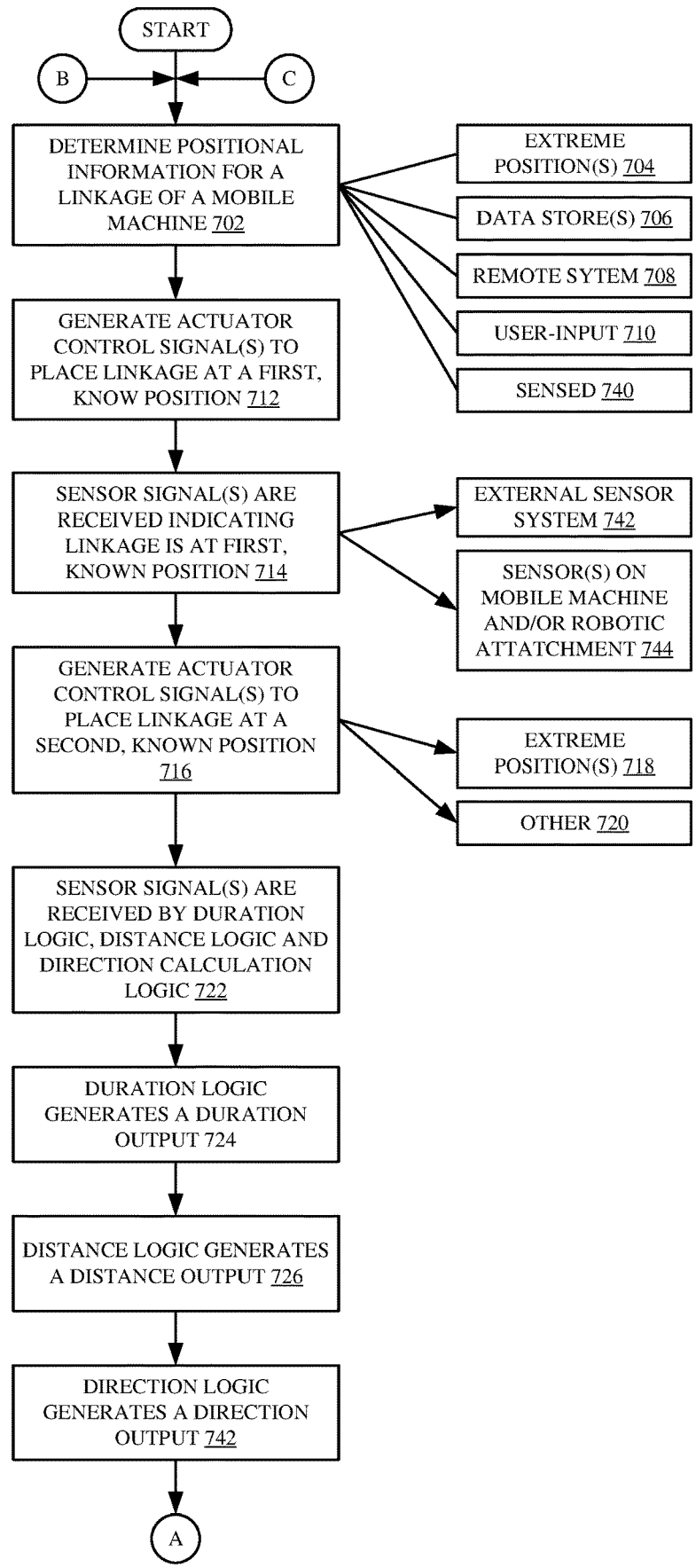
FIGS. 6A-6B are flow diagrams showing one example operation of determining a relationship between actuator control signals and a speed and/or direction of a linkage using a robotic positioning and calibration system illustrated in FIGS. 4A-4B.
Figure 6B:
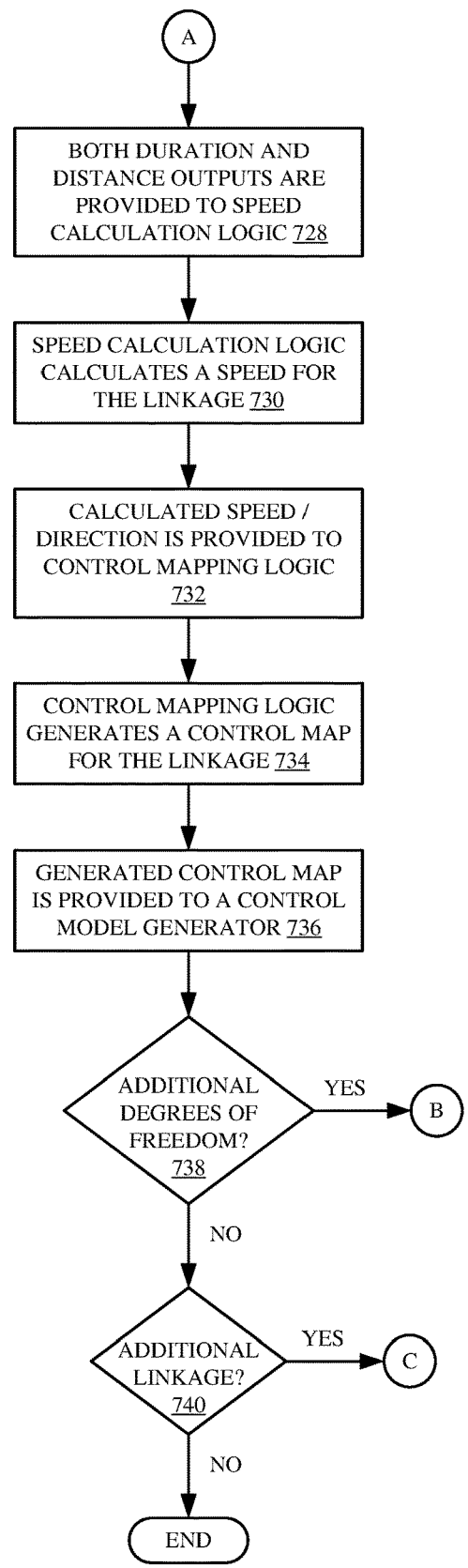

FIGS. 6A-6B are flow diagrams showing one example operation of determining a relationship between actuator control signals and a speed and/or direction of a linkage using control map generator system 536 of robotic positioning and calibration system 204 illustrated in FIGS. 4A-4B. Processing begins at block 702 where known-position logic 538 of control map generator system 536 uses retrieval logic 514 to determine positional information for linkages of mobile machine 100. In one example, the positional information includes extreme position information which identifies a known, extreme position of a given linkage, as indicated by block 704. Positional information may be obtained from data stores 418 and 488, as indicated by block 706, and/or a remote system 206 as indicated by block 708. Alternatively, positional information may be received through a user input, as indicated by block 710, and/or sensed using external sensor system(s) 202 and/or sensor(s) 420, 210, as indicated by block 740.

Processing then turns to block 712 where known-position logic 538 controls actuator control logic 504 to generate actuator control signals to position a linkage of mobile machine 100 at a first, known position (e.g., where the driving actuator(s) are at one extreme end of travel). Sensor signal(s) are subsequently received indicating that the linkage is at the first, known position as indicated by block 714. Sensor signals can be provided from external sensor system 202, as indicated by block 742, and/or sensor(s) 210, 420 as indicated by block 744. Once at the first, known position, processing turns to block 716 where known-position logic 538 controls actuator control logic 504 to generate control signals to move the linkage to a second, known position. In one example, the second, known position may be an opposite extreme position (e.g., where the driving actuators are at a second extreme end of travel), as indicated by block 718, or any other known position as indicated by block 720.

Sensor signal(s) indicative of the linkage movement from the first, known position to the second, known position are then generated from external sensor system 202 and/or sensor(s) 210, 420 and received by duration logic 540, distance logic 542 and direction calculation logic 546 as indicated by block 722. Upon receiving the sensor signal(s), processing turns to block 724 where duration logic 540 determines how long the movement took and generates a duration output indicative of a duration of time during which the linkage traveled from the first, known position to the second, known position. Then, processing turns to block 726 where distance logic 542 determines the distance that a reference point on the linkage (e.g., it's end) traveled during the movement and generates a distance output indicative of the distance between the first, known position and the second, known position. Processing then proceeds to block 742 where direction calculation logic 546 determines the direction of travel relative to a coordinate system and generates a direction output indicative of the direction that the reference point on the linkage traveled from the first, known position to the second, known position.

Both the duration output and the distance output are subsequently provided to speed calculation logic 544 as indicated by block 728. Upon receiving both the duration output and distance output, speed calculation logic 544 calculates a speed at which the linkage traveled, as indicated by block 730. A generated speed output, from speed calculation logic 544, and direction output, from direction calculation logic 546, are provided to control mapping logic 548 which uses them (and possibly other information) to determine a relationship between the actuator control signals, from actuator control logic 504, and a speed/direction (e.g., travel path) of the linkage as indicated by block 732. In response to the determined relationship, processing turns to block 734 where control mapping logic 548 generates a control map for the linkage that maps the actuator control signals to the speed/direction of movement of the linkage. In one example, the generated control map can be provided to control model generator 560 as indicated by block 736 and used as an input in generating a control model for mobile machine 100.

Processing then turns to block 738 where a determination is made by degree-of-freedom identification logic 510 whether there are additional degrees-of-freedom for the linkage. A determination may be made using kinematic information received from kinematic identification logic 508, in one example. If so, processing turns back to block 702 where positional information is obtained using retrieval logic 514 for the additional degree-of-freedom for this linkage. If not, processing turns to block 740 where actuator identification logic 512 determines whether there are additional linkages or actuators present on mobile machine 100, which are to be mapped to control signals. If so, processing reverts back to block 702 where positional information is obtained using retrieval logic 514 for the additional linkage or actuator. If not, processing subsequently ends.

Figure 7:
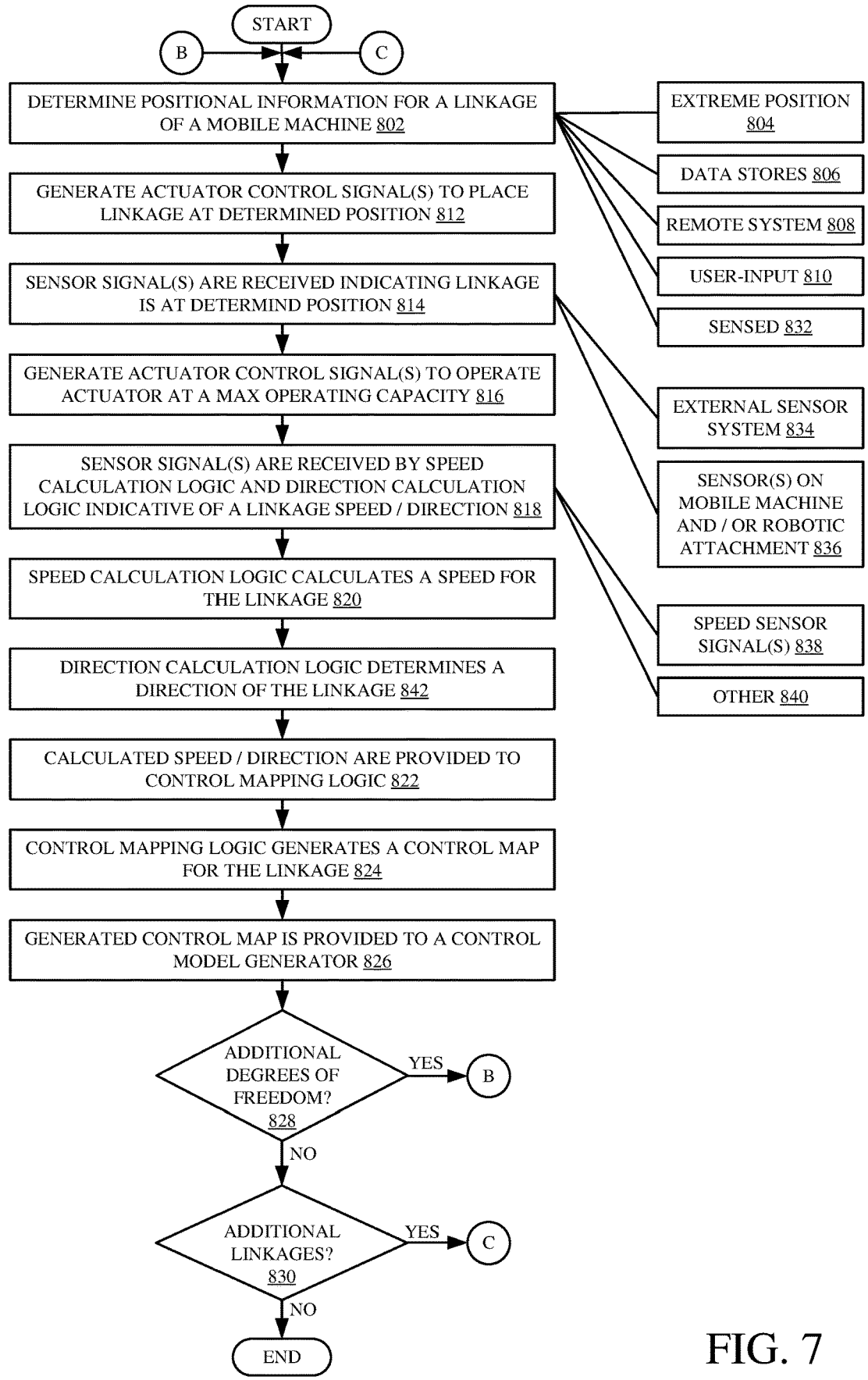
FIG. 7 is a flow diagram showing another example operation of determining a relationship between actuator control signals and a speed/direction of a linkage using a robotic positioning and calibration system illustrated in FIGS. 4A-4B.

FIG. 7 is a flow diagram showing another example operation of determining a relationship between actuator control signals generated by actuator control logic 504 and a speed/direction (travel path) of a linkage using control map generator system 536 of robotic positioning and calibration system 204 illustrated in FIGS. 4A-4B. Processing begins at block 802 where known-position logic 538 of control map generator system 536 uses retrieval logic 514 to obtain positional information for linkages of mobile machine 100. In one example, positional information identifies the extreme positions that the linkage can travel through, as indicated by block 804. Positional information may be received from data stores 418 and 488, as indicated by block 806, and/or a remote system 206 as indicated by block 808. Alternatively, positional information may be received through a user input, as indicated by block 810, or sensed using external sensor system(s) 202 and/or sensor(s) 420, 210, as indicated by block 832. In the latter example, a control signal can be generated and applied to an actuator until the linkage under consideration stops moving. The position of the linkage can be identified in the coordinate system, used by the external sensor system(s) 202, and can be identified as one extreme position when the linkage is driven by the selected actuator. This can be repeated in the opposite direction for the same actuator, and for other actuators.

Processing turns to block 812 where known-position logic 538 controls actuator control logic 504 to generate actuator control signals to position a linkage of mobile machine 100 at the known position. Sensor signal(s) are then received indicating that the linkage is at the known position as indicated by block 814. Sensor signals can be provided from external sensor system 202, as indicated by block 834, and/or sensor(s) 210, 420 as indicated by block 836. Once at the known position, processing turns to block 816 where actuator control logic 504 generates control signal(s) to operate actuator 454, corresponding to the linkage, at a maximum operating capacity. That is, the actuator is controlled to move at its maximum speed.

Sensor signal(s) indicative of a linkage speed and direction are then received by speed calculation logic 544 and direction calculation logic 546, respectively, as indicated by block 818. In one example, sensor signals are generated from a speed sensor coupled to the linkage and/or actuator as indicated by block 838. However, a variety of sensor signals may be received as indicated by block 840. Based on the received sensor signals, processing turns to block 820 where speed calculation logic 544 calculates a speed output indicative of a speed at which the linkage moved, based on the received sensor signals. Processing then turns to block 842 where direction calculation logic 546 identifies the direction of movement and generates a direction output indicative of a direction that the linkage traveled upon operating the actuator at the maximum operating capacity.

The speed and direction outputs are subsequently provided to control mapping logic 548, as indicated by block 822, and used to determine a relationship between the actuator control signals, generated by actuator control logic 504, and the calculated speed/direction (travel path) of the linkage. In response to the determined relationship, processing turns to block 824 where control mapping logic 548 generates a control map for the linkage that maps the determined relationship. In one example, the generated control map can be provided to control model generator 560 as indicated by block 826 and used as an input in generating a control model for mobile machine 100.

Processing then turns to block 828 where a determination is made by degree-of-freedom identification logic 510 whether there are additional degrees-of-freedom for the linkage. A determination may be made using kinematic information received from kinematic identification logic 508, in one example. If so, processing turns back to block 802 where positional information is obtained using retrieval logic 514 for the additional degree-of-freedom. If not, processing turns to block 830 where actuator identification logic 512 determines whether there are additional linkages present on mobile machine 100 that still need to be mapped to control signals. If there are more linkages, processing reverts back to block 802 where positional information is obtained using retrieval logic 514 for the additional linkage. If not, processing subsequently ends.

Figure 8:
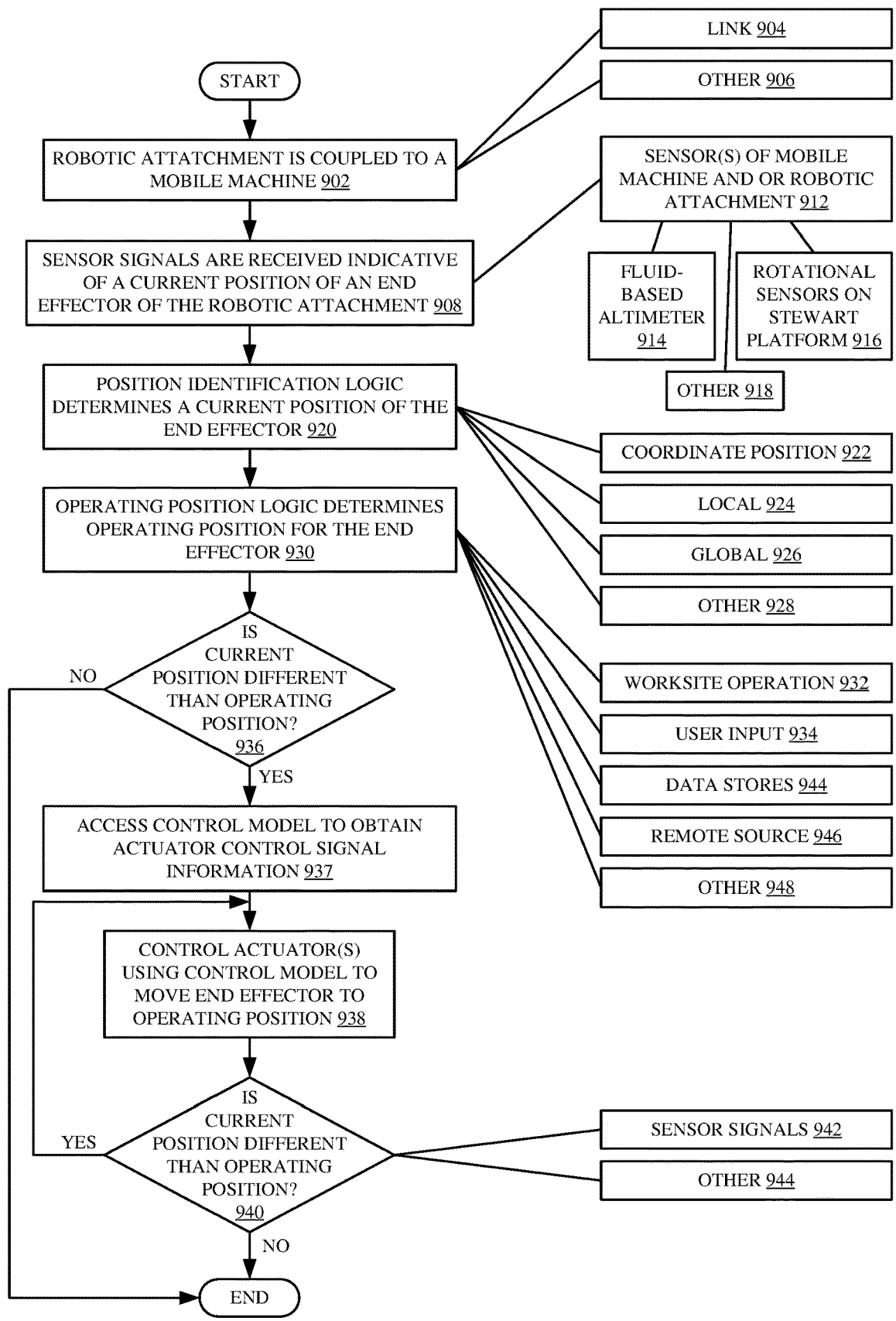
FIG. 8 is a flow diagram showing one example system of controlling a position of robotic attachment, which includes end effector, by generating control signals based on the control model.

FIG. 8 is a flow diagram showing one example in which system 204 controls a position of robotic attachment 200, which includes end effector 484, by generating control signals based on the control model. It is initially assumed that robotic attachment 200 is coupled to mobile machine 100 as indicated by block 902. In one example, robotic attachment 200 is coupled using link 466, as indicated by block 904. However, a variety of other ways are contemplated as well as indicated by block 906.

Processing proceeds to block 908 where position identification logic 530 receives sensor signal(s) indicative of a current position of robotic attachment 200. In one example, sensor signal(s) are received from sensor(s) 420, 210 as indicated by block 912 or other sensors. Sensor(s) 420, 210 on mobile machine 100 and robotic attachment 200, respectively, can include fluid-based altimeter 212 on mobile machine 100 that generates an indication of a current height of robotic attachment 200, as indicated by block 914, rotation sensor(s) 210 on Stewart platform 304 that measures a pitch, roll and yaw of Stewart platform 304, as indicated by block 916, among a wide variety of other sensor(s) as indicated by block 918.

Based on the received sensor signals, position identification logic 530 determines a current position for robotic attachment 200, including end effector 484, as indicated by block 920. This can include a coordinate position using coordinate logic 526, as indicated by block 922, a local position, as indicated by block 924, a global location as indicated by block 926, among a variety of other positional information as indication by block 928.

Processing turns to block 930 where operating position logic 528 determines an operating position that robotic attachment 200 is to be moved to in order to perform a desired operation. In one example, operating position data is obtained from data stores 418, 488 and/or 518, as indicated by block 944, remote system(s) 206, as indicated by block 946, or other sources as indicated by block 948. Additionally, an operating position for end effector 484 can be based on a worksite operation, as indicated by block 932, or a user-input (e.g. the user can manually provide inputs to move end effector 484 to its operating position or through a series of positions to perform an operation and the positions can be detected and stored so they can be repeated automatically), as indicated by block 934.

Processing then turns to block 936 where feed forward control system 562 receives both the position output, from position identification logic 530, and the operating position output, from operating position logic 528, and determines if the current position of end effector 484 is different than the operating position. If it is determined that the current position is the same as the operating position, processing subsequently ends. However, if the current position is different than the operating position, feed forward control system 562 uses map accessing logic 564 to access the control model, for the machine 100 and attachment 200, to identify the particular control signals that need to be generated to control the actuators to move the end effector 484 along a travel path that will move it from its current position to the operation position (or through the generated sequence of operating positions) at a desired speed, as indicated by block 937. Feed forward control logic 566, of feed forward control system 562, then controls actuator control logic 504 to move the end effector to the operating position. Logic 504 generates the actuator control signals for actuator(s) 454 of mobile machine 100, in accordance with the control model, to position end effector 484 at the operating position as indicated by block 938. Processing turns to block 940 where it is again determined by feed forward control system 562 whether the current position of end effector 484 is different than the operating position. In one example, this includes receiving additional sensor signals from sensor(s) 420, 210 as indicated by block 942.

If it is determined that a current position of robotic attachment 200 is still different than the operating position, processing reverts back to block 938 where actuator control logic 504 continues to control actuator(s) 454, based on feed forward control logic 566, in accordance with a generated control model. However, if the current position of end effector 484 is the same as the operating position, processing subsequently ends.

Figure 9:
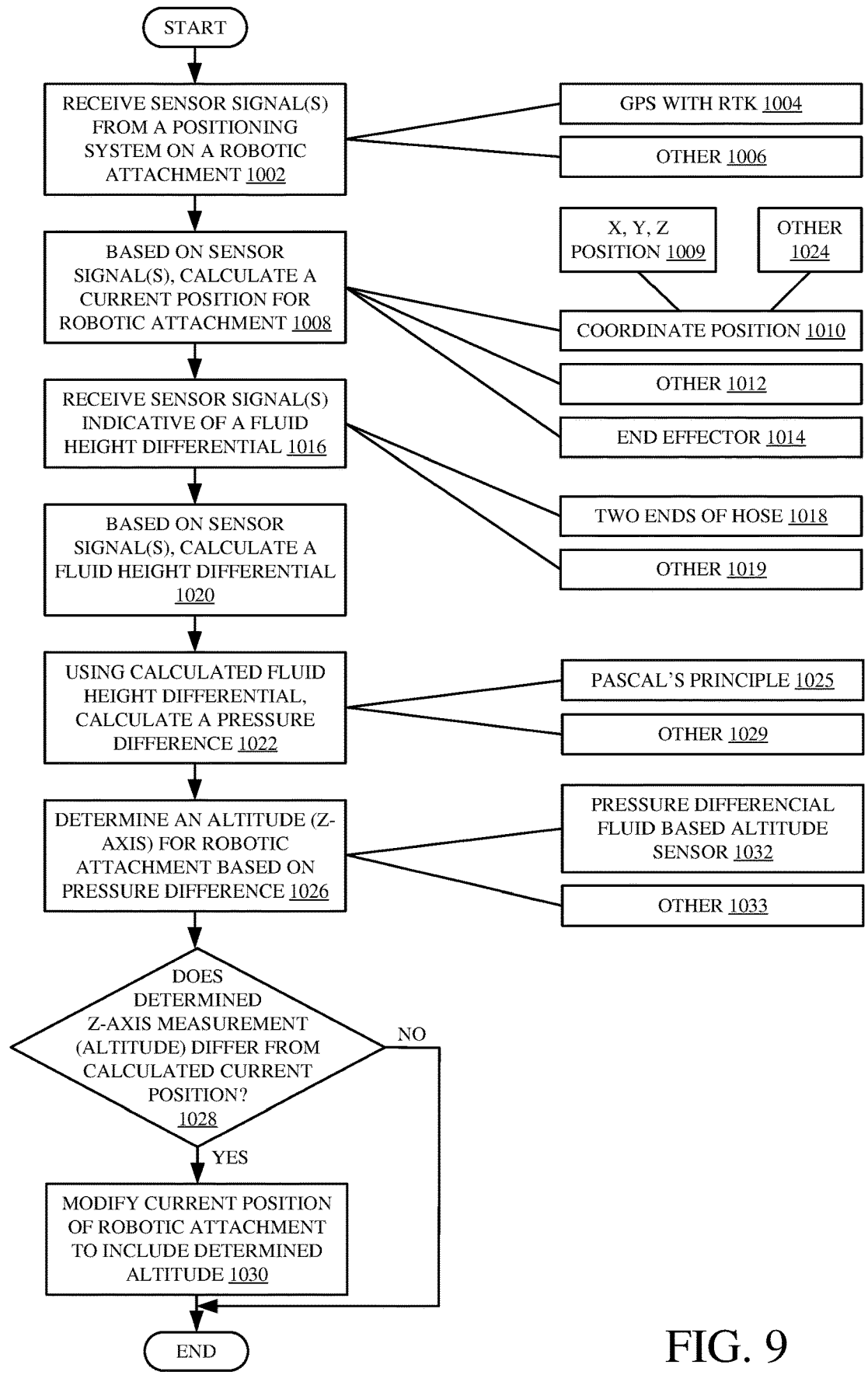
FIG. 9 is a flow diagram showing one example of modifying a current position determination of a robotic attachment using a robotic positioning and calibration system illustrated in FIGS. 4A-4B.

FIG. 9 is a flow diagram showing one example in which altimeter (or altitude sensor) 212 is used to control the position of robotic attachment 200 using the robotic positioning and calibration system 204 illustrated in FIGS. 4A-4B. It is illustratively described in the context of first identifying a current position of robotic attachment 200 using positioning system 208, and then modifying the position of robotic attachment 200. In other examples, a current position of robotic attachment 200 may be generated using sensor(s) 420, 210 in which positioning system 208 is not used. However, in the present example, processing begins at block 1002 where sensor signals are received from positioning system 208 indicative of a current position of robotic attachment 200. In one example, positioning system 208 includes a GPS system with RTK functionality coupled to robotic attachment 200, as indicated by block 1004. However, other positioning systems may be used as well, as indicated by block 1006.

Processing turns to block 1008 where a current position of robotic attachment 200 is calculated using position identification logic 530 of robotic positioning system 524. A current position can include a coordinate position, as indicated by block 1010, that includes x, y, and z axis coordinates (e.g. latitude, longitude, altitude, etc.) as indicated by block 1009. However, in other examples, only a subset of these coordinate positions are determined as indicated by block 1024. Additionally, in one example, a current position of robotic attachment 200 can also identify a position of end effector 484, as indicated by block 1014. However, a current position of robotic attachment 200 can include positional information for a variety of other components within robotic attachment 200, as indicated by block 1012.

Upon determining a current position of robotic attachment 200, using positioning system 208, processing subsequently turns to block 1016 where sensor signal(s) are received from altitude sensor 212 indicating an altitude of robotic attachment 200, or end effector 484, or both. Additional sensor signals may be received as well, as indicated by block 1019.

In one example, the sensor signal is indicative of a fluid height differential in tube 214 coupled to altitude sensor 212. In one example, a fluid height differential is determined by sensing a fluid height between the ends of tube 214 as indicated by block 1018. Based on the received sensor signal(s), position identification logic 530 calculates a fluid height differential between the two ends of tube 214 as indicated by block 1020. Using the fluid height differential, position identification logic 530 calculates a pressure differential, as indicated by block 1022, that, in one example, is in accordance with Pascal's principle as indicated by block 1025. However, other means of calculating a pressure differential may be used as well, as indicated by block 1029. Using the calculated pressure differential, an altitude (height) of robotic attachment 200, relative to machine 100 or otherwise, can be determined using position identification logic 530 as indicated by block 1026. Other coordinate positions may be calculated as well, as indicated by block 1033.

A determination is then made whether the altitude measurement differs from the calculated z-coordinate position from positioning system 208 as indicated by block 1028. If so, processing turns to block 1030 where position identification logic 530 modifies a current coordinate position of robotic attachment 200 to incorporate the altitude measurement as indicated by block 1030. Upon modifying a current position of robotic attachment 200 or, alternatively, determining that a current coordinate position does not differ from the altitude measurement, processing subsequently ends.

Figure 10:
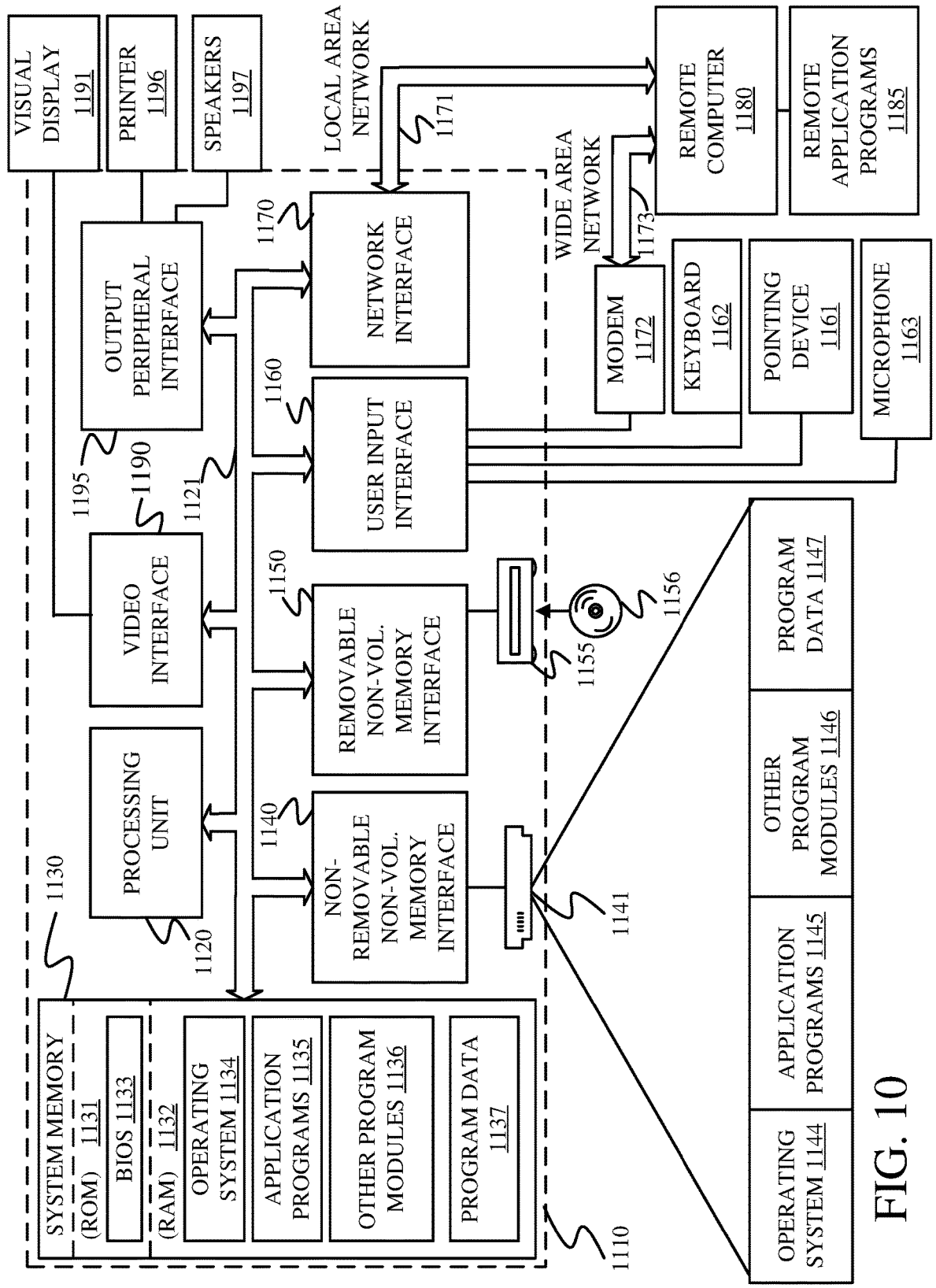
FIG. 10 is a block diagram showing one example of a computing environment that can be used in the architecture illustrated in previous FIGS.

FIG. 10 is a block diagram showing one example of a computing environment that can be used in the architecture illustrated in previous FIGS. With reference to FIG. 10, an example system for implementing some examples includes a general-purpose computing device in the form of a computer 1110. Components of computer 1110 may include, but are not limited to, a processing unit 1120 (which can comprise processors or servers from previous Figures), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. Memory and programs described with respect to FIGS. 4A-4B can be deployed in corresponding portions of FIG. 10.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 10 illustrates operating system 1134, application programs 1135, other program modules 1136, and program data 1137.

The computer 1110 may also include other removable/non-removable volatile/nonvolatile computer storage media. By way of example only, FIG. 10 illustrates a hard disk drive 1141 that reads from or writes to non-removable, nonvolatile magnetic media, and an optical disk drive 1155, and non-volatile optical disk 1156. The hard disk drive 1141 is typically connected to the system bus 1121 through a non-removable memory interface such as interface 1140, and optical disk drive 1155 are typically connected to the system bus 1121 by a removable memory interface, such as interface 1150.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 1110. In FIG. 10, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137.

A user may enter commands and information into the computer 1110 through input devices such as a keyboard 1162, a microphone 1163, and a pointing device 1161, such as a mouse, trackball or touch pad. Other input devices (not shown) may include a joystick, game pad, satellite dish, scanner, or the like. These and other input devices are often connected to the processing unit 1120 through a user input interface 1160 that is coupled to the system bus, but may be connected by other interface and bus structures. A visual display 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 is operated in a networked environment using logical connections (such as a local area network—LAN, or wide area network WAN) to one or more remote computers, such as a remote computer 1180.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. In a networked environment, program modules may be stored in a remote memory storage device. FIG. 10 illustrates, for example, that remote application programs 1185 can reside on remote computer 1180.

It should also be noted that the different examples described herein can be combined in different ways. That is, parts of one or more examples can be combined with parts of one or more other examples. All of this is contemplated herein.

Example 1 is a computing system, comprising:
actuator control logic configured to generate and send control signals to an actuator of a mobile machine configured to drive direction and speed movement of a linkage on the mobile machine; and
a control map generator system configured to receive sensor signals indicative of the direction and speed movement of the linkage on the mobile machine, and, based on the received sensor signals, generate a control mapping that maps the control signals to the direction and speed movement of the linkage of the mobile machine.

Example 2 is the computing system of any or all previous examples and further comprising:
a robotic positioning system configured to position a robotic attachment to the mobile machine using the control mapping.

Example 3 is the computing system of any or all previous examples wherein the robotic positioning system comprises:
operating position logic configured to identify an operating position of the robotic attachment; and
a feed forward control system configured to generate an actuator control signal, based on the control mapping, to move the robotic attachment to the operating position.

Example 4 is the computing system of any or all previous examples wherein the control map generator system is configured to generate a plurality of control mappings that map from a plurality of different control signals to a plurality of different direction and speed movements of the linkage.

Example 5 is the computing system of any or all previous examples further comprising:
a control model generator configured to receive the plurality of control mappings and generate a control model for the mobile machine, the robotic positioning system being configured to position the robotic attachment based on the control model.

Example 6 is the computing system of any or all previous examples wherein the sensor signals are generated from at least one optical sensor system located external to the mobile machine.

Example 7 is the computing system of any or all previous examples wherein the sensor signals are generated from at least one sensor system located on the mobile machine.

Example 8 is the computing system of any or all previous examples further comprising:
degree-of-freedom identification logic configured to identify a number of degrees-of-freedom for each linkage of the mobile machine.

Example 9 is the computing system of any or all previous examples wherein the control map generator is configured to generate a plurality of mappings, for each linkage on the mobile machine, for each degree-of-freedom.

Example 10 is the computing system of any or all previous examples further comprising:
configuration identification logic configured to receive the sensor signals indicative of the direction and speed movement of the linkage, and, based on the sensor signals, determine a physical configuration of the mobile machine and generate a configuration output indicative of the physical configuration of the mobile machine.

Example 11 is the computing system of any or all previous examples further comprising:
kinematic identification logic configured to receive the sensor signals indicative of the direction and speed movement of the linkage and, based on the sensor signals, determine a set of kinematics that characterize the mobile machine and generate a kinematic output indicative of the set of kinematics of the mobile machine.

Example 12 is the computing system of any or all previous examples wherein at least one of the sensor signals is generated from a fluid-based altimeter on the mobile machine configured to generate a sensor signal indicative of a current height of the robotic attachment.

Example 13 is the computing system of any or all previous examples wherein at least one of the sensor signals is generated from at least one rotational sensor located on the robotic attachment configured to generate a sensor signal indicative of a current rotational position of the robotic attachment.

Example 14 is A mobile machine assembly, comprising:
an actuator configured to drive movement of a linkage on the mobile machine;
an actuator controller configured to generate an actuator control signal to actuate the actuator;
a plurality of sensors configured to generate sensor signals indicative of the movement of the linkage on the mobile machine;
a robotic attachment coupled to the mobile machine for movement with the linkage; and
a robotic positioning and calibration system configured to receive the sensor signals from the plurality of sensors and, based on the sensor signals, generate a control mapping, the control mapping being indicative of a relationship between the actuator control signal and a corresponding speed and direction of movement of the robotic attachment.

Example 15 is the mobile machine assembly of any or all previous examples wherein the robotic positioning and calibration system is configured to control the actuator controller to automatically generate a plurality of different actuator control signals to actuate a plurality of different actuators and to generate a plurality of different mappings between the plurality of different actuator control signals and the speed and direction of movement of the robotic attachment.

Example 16 is the mobile machine assembly of any or all previous examples wherein the robotic positioning and calibration system further comprises:
a control model generator configured to generate a control model based on the plurality of different mappings.

Example 17 is the mobile machine assembly of any or all previous examples wherein at least one of the plurality of sensors comprises:
a fluid-based altimeter configured to generate a sensor signal indicative of a current height of the robotic attachment.

Example 18 is a method of generating a control map for a mobile machine, comprising:
generating an actuator control signal to control an actuator to move an attachment from a first known position to a second known position;
receiving sensor signals indicative of a direction of movement, a distance between the first and second known positions and a duration of time during which the attachment moved from the first to the second known position;
based on the received sensor signals, determining a speed and direction of movement of the attachment; and
mapping the control signal to the speed and direction of movement of the attachment.

Example 19 is the method of any or all previous examples and further comprising:
determining a number of degrees-of-freedom for the attachment;
generating a plurality of actuator control signals each controlling the actuator to move the attachment between known positions in a different degree-of-freedom;
receiving sensor signals indicative of the direction, distance and duration of movement in each degree-of-freedom;
determining a speed and direction of movement of the attachment in each degree-of-freedom; and
mapping the control signals to the speed and direction of movement in each degree-of-freedom.

Example 20 is the method of any or all previous examples wherein receiving sensor signals comprises:
receiving an altitude signal indicative of an altitude of the attachment, from a fluid-based altimeter.

What is claimed is:

1. A computing system, comprising:
actuator control logic configured to generate and send control signals to an actuator of a mobile machine configured to drive direction and speed movement of a linkage on the mobile machine;
degree-of-freedom identification logic configured to identify a number of degrees-of-freedom for each linkage of the mobile machine; and
a control map generator system configured to receive sensor signals indicative of the direction and speed movement of the linkage on the mobile machine, and, based on the received sensor signals, generate a control mapping that maps the control signals to the direction and speed movement of the linkage of the mobile machine for at least one of the number of degrees-of-freedom.

2. The computing system of claim 1, and further comprising:
a robotic positioning system configured to position a robotic attachment of the mobile machine using the control mapping.

3. The computing system of claim 2, wherein the robotic positioning system comprises:
operating position logic configured to identify an operating position of the robotic attachment; and
a feed forward control system configured to generate an actuator control signal, based on the control mapping, to move the robotic attachment to the operating position.

4. The computing system of claim 3, wherein the control map generator system is configured to generate a plurality of control mappings that map from a plurality of different control signals to a plurality of different direction and speed movements of the linkage.

5. The computing system of claim 4, and further comprising:
a control model generator configured to receive the plurality of control mappings and generate a control model for the mobile machine, the robotic positioning system being configured to position the robotic attachment based on the control model.

6. The computing system of claim 1, wherein the sensor signals are generated from at least one optical sensor system located external to the mobile machine.

7. The computing system of claim 2, wherein the sensor signals are generated from at least one sensor system located on the mobile machine.

8. The computing system of claim 7, wherein at least one of the sensor signals is generated from a fluid-based altimeter on the mobile machine configured to generate a sensor signal indicative of a current height of the robotic attachment.

9. The computing system of claim 7, wherein at least one of the sensor signals is generated from at least one rotational sensor located on the robotic attachment configured to generate a sensor signal indicative of a current rotational position of the robotic attachment.

10. The computing system of claim 1, wherein the control map generator is configured to generate a plurality of mappings, for each linkage on the mobile machine, for each degree-of-freedom.

11. The computing system of claim 1, further comprising:
configuration identification logic configured to receive the sensor signals indicative of the direction and speed movement of the linkage, and, based on the sensor signals, determine a physical configuration of the mobile machine and generate a configuration output indicative of the physical configuration of the mobile machine.

12. The computing system of claim 11, further comprising:
kinematic identification logic configured to receive the sensor signals indicative of the direction and speed movement of the linkage and, based on the sensor signals, determine a set of kinematics that characterize the mobile machine and generate a kinematic output indicative of the set of kinematics of the mobile machine.

13. A mobile machine assembly, comprising:
an actuator configured to drive movement of a linkage on the mobile machine;
an actuator controller configured to generate an actuator control signal to actuate the actuator;
a plurality of sensors configured to generate sensor signals indicative of the movement of the linkage on the mobile machine, wherein the plurality of sensors incude: a fluid-based altimeter configured to generate a sensor signal indicative of a current height of the robotic attachment;
a robotic attachment coupled to the mobile machine for movement with the linkage; and
a robotic positioning and calibration system configured to receive the sensor signals from the plurality of sensors and, based on the sensor signals, generate a control mapping, the control mapping being indicative of a relationship between the actuator control signal and a corresponding speed and direction of movement of the robotic attachment.

14. The mobile machine assembly of claim 13, wherein the robotic positioning and calibration system is configured to control the actuator controller to automatically generate a plurality of different actuator control signals to actuate a plurality of different actuators and to generate a plurality of different mappings between the plurality of different actuator control signals and the speed and direction of movement of the robotic attachment.

15. The mobile machine assembly of claim 13, wherein the robotic positioning and calibration system further comprises:
a control model generator configured to generate a control model based on the plurality of different mappings.

16. A method of generating a control map for a mobile machine, comprising:
generating an actuator control signal to control an actuator to move an attachment from a first known position to a second known position;
receiving sensor signals indicative of a direction of movement, a distance between the first and second known positions and a duration of time during which the attachment moved from the first to the second known position;
based on the received sensor signals, determining a speed and direction of movement of the attachment;
mapping the control signal to the speed and direction of movement of the attachment;
determining a number of degrees-of-freedom for the attachment;

generating a plurality of actuator control signals each controlling the actuator to move the attachment between known positions in a different degree-of-freedom;

receiving sensor signals indicative of the direction, distance and duration of movement in each degree-of-freedom;

determining a speed and direction of movement of the attachment in each degree-of-freedom; and mapping the control signals to the speed and direction of movement in each degree-of-freedom.

17. The method of claim 16, wherein receiving sensor signals comprises:

receiving an altitude signal indicative of an altitude of the attachment, from a fluid-based altimeter.

* * * * *